United States Patent
Jeong et al.

(10) Patent No.: US 10,554,627 B2
(45) Date of Patent: Feb. 4, 2020

(54) PROXIMITY COMMUNICATION METHOD AND APPARATUS

(71) Applicant: Samsung Electronics Co., Ltd., Suwon-si, Gyeonggi-do (KR)

(72) Inventors: Jin-Hong Jeong, Yongin-si (KR); Sun-Kee Lee, Seongnam-si (KR); Cheol-Ho Cheong, Seoul (KR); Joon-Young Cho, Suwon-si (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 14/638,217

(22) Filed: Mar. 4, 2015

(65) Prior Publication Data

US 2015/0256515 A1    Sep. 10, 2015

(30) Foreign Application Priority Data

Mar. 6, 2014    (KR) .................. 10-2014-0026707

(51) Int. Cl.
| | | |
|---|---|---|
| *H04L 29/06* | (2006.01) | |
| *G06Q 20/38* | (2012.01) | |
| *G06F 21/62* | (2013.01) | |
| *G06Q 30/06* | (2012.01) | |

(52) U.S. Cl.
CPC ....... *H04L 63/0421* (2013.01); *G06Q 20/383* (2013.01); *H04L 63/0876* (2013.01); *G06F 21/6254* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 6,311,269 B2 * | 10/2001 | Luckenbaugh | ... G06F 17/30861 707/E17.107 |
| 6,470,340 B1 * | 10/2002 | Kawai | ..................... H04L 29/06 707/922 |
| 7,200,566 B1 | 4/2007 | Moore et al. | |
| 10,037,544 B2 * | 7/2018 | Smith | ................ G06Q 30/0242 |
| 10,129,228 B1 * | 11/2018 | Mobarak | ............... H04L 63/061 |
| 2002/0069122 A1 * | 6/2002 | Yun | ........................ G06Q 30/06 705/26.1 |

(Continued)

FOREIGN PATENT DOCUMENTS

| | | |
|---|---|---|
| KR | 10-2008-0090790 A | 10/2008 |
| KR | 10-2013-0100807 A | 9/2013 |
| WO | 2007/092577 A2 | 8/2007 |

OTHER PUBLICATIONS

Parziae (Parziae et al., IBM, "TCP/IP Tutorial and Technical Overview", GG24-3376-07, Dec. 2006).*

(Continued)

*Primary Examiner* — Piotr Poltorak
(74) *Attorney, Agent, or Firm* — Jefferson IP Law, LLP

(57) ABSTRACT

A method for relaying a message is provided. The method includes transmitting, by an electronic device, a first message including a first anonymous identifier of the electronic device to at least one external device, and receiving a second message including the first anonymous identifier and a second anonymous identifier of the at least one external device.

17 Claims, 9 Drawing Sheets

(56) References Cited

U.S. PATENT DOCUMENTS

| | | | | |
|---|---|---|---|---|
| 2002/0111968 A1* | 8/2002 | Ching | G06F 16/748 | 715/229 |
| 2002/0132629 A1* | 9/2002 | Desai | H04L 12/2801 | 455/500 |
| 2002/0147766 A1* | 10/2002 | Vanska | G06F 21/6245 | 709/203 |
| 2002/0164059 A1* | 11/2002 | DiFilippo | G06T 7/0012 | 382/128 |
| 2002/0178370 A1* | 11/2002 | Gurevich | G06F 21/34 | 713/189 |
| 2003/0140225 A1* | 7/2003 | Banks | G06Q 20/02 | 713/155 |
| 2003/0149880 A1* | 8/2003 | Shamsaasef | H04L 63/062 | 713/182 |
| 2003/0182551 A1* | 9/2003 | Frantz | G06F 21/41 | 713/170 |
| 2004/0111630 A1* | 6/2004 | Hwang | G06F 21/10 | 713/193 |
| 2004/0268131 A1* | 12/2004 | Kudo | H04L 63/061 | 713/182 |
| 2005/0144468 A1* | 6/2005 | Northcutt | G06F 21/10 | 713/189 |
| 2005/0203843 A1* | 9/2005 | Wood | G06Q 20/102 | 705/40 |
| 2005/0283621 A1* | 12/2005 | Sato | G06F 21/6254 | 713/189 |
| 2006/0021018 A1* | 1/2006 | Hinton | H04L 63/06 | 726/10 |
| 2006/0064588 A1* | 3/2006 | Tidwell | G06F 21/316 | 713/169 |
| 2006/0106799 A1* | 5/2006 | Maijala | G06F 21/6254 | |
| 2006/0111986 A1 | 5/2006 | Yorke et al. | | |
| 2006/0136253 A1* | 6/2006 | Yokota | G06F 21/6254 | 705/51 |
| 2006/0288407 A1* | 12/2006 | Naslund | H04L 9/0844 | 726/9 |
| 2007/0083750 A1* | 4/2007 | Miura | G06F 21/445 | 713/155 |
| 2007/0224993 A1* | 9/2007 | Forsberg | H04L 9/0844 | 455/436 |
| 2008/0103984 A1* | 5/2008 | Choe | G06O 20/20 | 705/76 |
| 2008/0107269 A1* | 5/2008 | Gehrmann | H04L 63/0442 | 380/270 |
| 2008/0140767 A1* | 6/2008 | Rao | H04L 65/1013 | 709/203 |
| 2008/0178264 A1* | 7/2008 | Keohane | H04L 63/0815 | 726/3 |
| 2009/0024848 A1* | 1/2009 | Takasugi | H04L 9/3236 | 713/169 |
| 2009/0235083 A1* | 9/2009 | Bleahen | G06F 21/72 | 713/178 |
| 2009/0305671 A1* | 12/2009 | Luft | G06Q 30/0205 | 455/411 |
| 2010/0042833 A1* | 2/2010 | Platt | G06F 21/6254 | 713/168 |
| 2010/0064354 A1* | 3/2010 | Irvine | G06F 21/6218 | 726/5 |
| 2010/0275038 A1* | 10/2010 | Lin | G06F 21/602 | 713/193 |
| 2011/0093710 A1* | 4/2011 | Galvin | H04L 63/061 | 713/169 |
| 2012/0117639 A1* | 5/2012 | Bouz | G06F 21/31 | 726/10 |
| 2012/0144469 A1* | 6/2012 | Ainslie | G06F 3/0481 | 726/7 |
| 2012/0209749 A1* | 8/2012 | Hammad | G06Q 30/06 | 705/27.1 |
| 2013/0018757 A1* | 1/2013 | Anderson | G06Q 20/085 | 705/26.35 |
| 2013/0086668 A1* | 4/2013 | Prasad | H04L 9/0833 | 726/7 |
| 2013/0137398 A1* | 5/2013 | Yang | H04L 1/0041 | 455/411 |
| 2013/0196638 A1 | 8/2013 | Kim et al. | | |
| 2013/0262857 A1* | 10/2013 | Neuman | H04L 63/08 | 713/155 |
| 2013/0297422 A1 | 11/2013 | Hunter et al. | | |
| 2013/0311768 A1* | 11/2013 | Fosmark | G06Q 20/3223 | 713/155 |
| 2013/0326007 A1* | 12/2013 | Turner | G06F 21/6254 | 709/217 |
| 2014/0058938 A1* | 2/2014 | McClung, III | G06Q 20/227 | 705/41 |
| 2014/0123307 A1* | 5/2014 | Jung | H04L 41/5054 | 726/27 |
| 2014/0237063 A1* | 8/2014 | Yoon | H04L 63/061 | 709/206 |
| 2014/0278542 A1* | 9/2014 | Fernandez | G16H 10/60 | 705/3 |
| 2014/0298037 A1* | 10/2014 | Xiao | H04L 9/3273 | 713/181 |
| 2015/0089595 A1* | 3/2015 | Telles | H04L 63/08 | 726/4 |
| 2015/0256515 A1* | 9/2015 | Jeong | H04L 63/0421 | 726/4 |
| 2016/0028554 A1* | 1/2016 | Lea | H04L 12/189 | 370/312 |
| 2016/0078095 A1* | 3/2016 | Man | G06F 16/24575 | 707/689 |

OTHER PUBLICATIONS

Singh et al., ("TrustMe: Anonymous Management of Trust Relationships in Decentralized P2P Systems", Proceedings of the Thrid INternational Conference on Peer-to-Peer Computeing, 0-7695-2023-5/03, IEEE 2003).*

Parziale et al. (TCP/IP Tutorial and Technical Overview, IBM, found at ibm.com/redbooks, Dec. 2006).*

JavaInterview, "TCP/IP three way handshake" found at www.javainterview.net/misc/tcp-ip, May 2015.*

Feghhi et al. (Jalal Feghhi, Jalil Feghhi, Peter Williams, Digital Certificates Applied Internet Security, 1999, ISBN: 0201309807).*

Stein (Lincoln D. Stein, "Web Sercurity, a step-by-step reference guide", 1998, ISBN: 0201634899).*

Alfred J. Menezes, Paul C. van Oorschot, Scott A. Vanstone, "Handbook of applied cryptography", 1997, ISBN: 0849385237.*

Alexandre Alapetite, "Dynamic 2D-barcodes for multi-device Web session migration including mobile phones", Personal and Ubiquitous Computing, vol. 14 Issue 1, Jan. 2010.*

* cited by examiner

PROXIMITY COMMUNICATION METHOD AND APPARATUS

CROSS-REFERENCE TO RELATED APPLICATION(S)

This application claims the benefit under 35 U.S.C. § 119(a) of a Korean patent application filed on Mar. 6, 2014 in the Korean Intellectual Property Office and assigned Serial number 10-2014-0026707, the entire disclosure of which is hereby incorporated by reference.

TECHNICAL FIELD

The present disclosure relates to a proximity communication method and an apparatus. More particularly, the present disclosure relates to a method and an apparatus for communicating between electronic devices by which wireless or wired communication can be conducted.

BACKGROUND

A technical background of various embodiments of the present disclosure may be a technology for operations of electronic devices (e.g., computers, mobile devices, etc.) which include a central controller. Further, it may be a technology of communication using at least one of wireless communication or wired communication of the electronic devices.

The various embodiments of the present disclosure include a method for directly relaying messages by electronic devices based on a distance or time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an electronic device for relaying a message.

In accordance with an aspect of the present disclosure, a method for relaying a message is provided. The method including transmitting, by an electronic device, a first message including a first anonymous identifier of the electronic device to at least one external device, and receiving a second message including the first anonymous identifier and a second anonymous identifier of the at least one external device.

In accordance with an aspect of the present disclosure, an electronic device is provided. The electronic device may include a communication module configured to transmit and receive a first message and a second message, and may include a processor configured to be functionally connected with the communication module, to transmit the first message including a first anonymous identifier to at least one external device, and to receive the second message, in response to the first message, including the first anonymous identifier and a second anonymous identifier of the at least one external device.

In accordance with another aspect of the present disclosure, a non-transitory computer-readable recording medium having a program recorded thereon is provided. The program causing a computer to execute a method including transmitting a first message including a first anonymous identifier of an electronic device to at least one external device, and receiving a second message including the first anonymous identifier and a second anonymous identifier of the at least one external device.

Electronic devices in accordance with another aspect of the present disclosure can transmit and receive messages to and from other devices without connection therewith.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
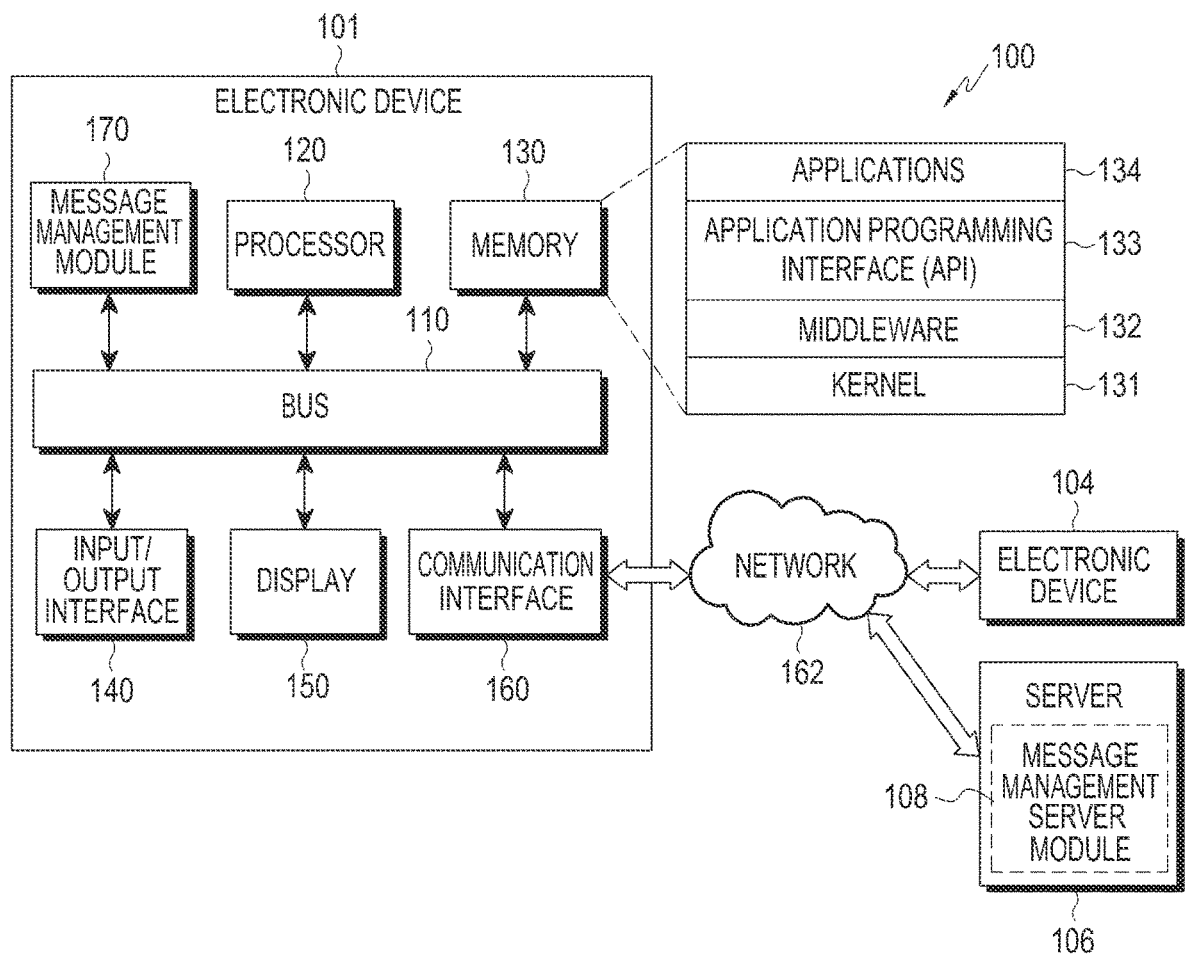
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Hereinafter, the terms "include" or "may include", which may be used in various embodiments of the present disclosure, refer to the presence of disclosed functions, operations or elements, and do not restrict the addition of one or more functions, operations or elements. Further, it should be understood that the terms "include" or "have" in various embodiments of the present disclosure refer to the presence of features, numbers, steps, operations, elements or components or a combination thereof, which are described in the specification, and do not rule out the presence or the addition of features, numbers, steps, operations, elements or components or a combination thereof.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

The term "or" in various embodiments of the disclosure means the inclusion of at least one or all of the disclosed elements. It is to be understood that the singular forms "a," "an," and "the" include plural referents unless the context clearly dictates otherwise. For example, "A or B" may mean any one of the inclusion of A, the inclusion of B, or the inclusion of A and B. Thus, for example, reference to "a component surface" includes reference to one or more of such surfaces.

"The first" or "the second" used in various embodiments of the present disclosure may modify various elements of embodiments, and may not restrict the corresponding elements. For example, the above terms do not restrict the sequence and/or the importance of the corresponding elements. The above terms may be used to distinguish one element from the other element. For example, a first user device and a second user device indicate different user devices although both of them are user devices. For example, without departing from the scope of the present disclosure, a first structural element may be named a second structural named. Similarly, the second structural element also may be named the first structural element.

In sentences that describe one element as being "connected" or "linked" with another element should be construed to encompass a case in which a new element may be interposed between one element and the other element as well as a case in which one element is directly connected or linked with the other element. On the contrary, in sentences that describe one element as being "directly connected" or "directly linked" with another element may be understood to mean that a new element does not exist between one element and the other element.

Terms used in various embodiments of the present disclosure are intended not to restrict various embodiments of the present disclosure but to explain specific embodiments. Singular forms are intended to include plural forms unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), MP3 players, mobile medical devices, cameras, wearable devices (e.g., Head-Mounted-Devices (HMDs) such as electronic glasses), electronic clothes, electronic bracelets, electronic necklaces, electronic accessories, electronic tattoos, or smart watches.

According to another embodiment, the electronic devices may include smart home appliances adopting a communication function. The smart home appliances may include at least one of, for example, televisions, Digital Video Disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to another embodiment, the electronic devices may include at least one of various medical devices (e.g., a Magnetic Resonance Angiography (MRA), a Magnetic Resonance Imaging (MRI), a Computed Tomography (CT) machine, and an ultrasonic machine), navigation devices, Global Positioning System (GPS) receivers, Event Data Recorders (EDR), Flight Data Recorders (FDR), vehicle infotainment devices, electronic devices for ships (e.g., navigation devices for ships, and gyro-compasses), avionics, security devices, automotive head units, robots for home or industry, Automatic Teller Machines (ATMs) in banks, or Point Of Sales (POS) in shops.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). Electronic devices according to various embodiments of the present disclosure may include one or more combinations of the above-described devices. In addition, electronic devices according to various embodiments of the present disclosure may include flexible devices. Further, it is obvious to those skilled in the art that electronic devices according to various embodiments of the present disclosure are not limited to the above-described devices.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Hereinafter, an electronic device according to various embodiments of the present disclosure will be described with reference to the accompanying drawings. The term "a user" used in various embodiments may refer to a person who uses electronic devices or a device (e.g., an artificial intelligence electronic device) that uses electronic devices.

FIG. 1 illustrates a network environment including an electronic device according to an embodiment of the present disclosure.

Referring to FIG. 1, a network environment 100 including an electronic device 101 that includes a bus 110, a processor 120, a memory 130, an input/output interface 140, a display 150, a communication interface 160, and a message management module 170 is illustrated.

The bus 110 may be a circuit configured to connect the above-described elements with each other and to transfer a communication (e.g., control messages) between the above-described elements.

The processor 120 may receive instructions from the above-described elements (e.g., the memory 130, the input/output interface 140, the display 150, the communication interface 160, the message management module 170, or the like) through, for example, the bus 110, then decode the received instructions, and perform calculation or data processing according to the decoded instructions.

The memory 130 may store instructions or data received from the processor 120 or other elements (e.g., the input/output interface 140, the display 150, the communication interface 160, the message management module 170, or the like) or generated by the processor 120 or other elements. The memory 130 may include programming modules such as, for example, a kernel 131, a middleware 132, an Application Programing Interface (API) 133, and/or applications 134. Each of the programming modules may be configured with software, firmware, hardware, or a combination thereof.

The kernel 131 may control or manage system resources (e.g., the bus 110, the processor 120, the memory 130, or the like) which are used in performing operations or functions implemented by other programming modules, for example the middleware 132, the API 133 and/or the applications 134. Further, the kernel 131 may provide interfaces by which the middleware 132, the API 133 and/or the applications 134 may access each element of the electronic device 101 for control or management.

The middleware 132 may play an intermediate role between the API 133 or the applications 134 and the kernel 131 to communicate with each other for transmission and reception of data. Further, in relation to requests for operation received from the applications 134, the middleware 132 may control (e.g., scheduling or load-balancing) the requests by using, for example, a method of determining sequence for using system resources (e.g., the bus 110, the processor 120, the memory 130, or the like) of the electronic device 101 with respect to at least one application among the applications 134.

The API 133 is an interface by which the applications 134 control functions provided from the kernel 131 or the middleware 132, and may include, for example, at least one interface or function (e.g., instructions) for file control, window control, image processing, or text control.

According to an embodiment, the applications 134 may include a Short Message Service (SMS)/Multimedia Message Service (MMS) application, an e-mail application, a calendar application, an alarm application, a health care application (e.g., an application for measuring the amount of exercise or blood sugar), an environmental information application (e.g., an application for providing atmospheric pressure, humidity, or temperature), or the like. Additionally or alternatively, the applications 134 may include an application related to the exchange of information between the electronic device 101 and external electronic devices (e.g., an electronic device 104). The information-exchange-related application may include, for example, a notification relay application for relaying specific information to the external electronic device, or a device management application for managing the external electronic device.

For example, the notification relay application may include a function of transferring notification information generated in other applications (e.g., the SMS/MMS application, the e-mail application, the health care application, or the environmental information application) of the electronic device 101 to external electronic device (e.g., the electronic device 104). Additionally or alternatively, the notification relay application may receive notification information from, for example, external electronic device (e.g., the electronic device 104) and provide the same to a user. The device management application may manage (e.g., install, delete, or update), for example, at least some functions (e.g., turning an external electronic device (or some elements) on or off, or adjusting the brightness (or resolution) of a display) of an external electronic device (e.g., the electronic device 104) that communicates with the electronic device 101, applications performed in the external electronic device, or services (e.g., a phone call service, or a messaging service) provided in the external electronic device.

According to an embodiment, the applications 134 may include applications, which are designated according to the property (e.g., the type of electronic device) of the external electronic device (e.g., the electronic device 104). For example, if the external electronic device is an MP3 player, the applications 134 may include applications related to reproduction of music. Likewise, if the external electronic device is a mobile medical device, the applications 134 may include an application related to a health care. According to an embodiment, the application 134 may include at least one of applications designated in the electronic device 101 and/or applications received from external electronic devices (e.g., a server 106, or an electronic device 104).

The input/output interface 140 may transfer instructions or data input by a user through input/output devices (e.g., sensors, keyboards, or touch screens) to the processor 120, the memory 130, the communication interface 160, and/or the message management module 170 through, for example, the bus 110. For example, the input/output interface 140 may provide data on a user's touch input through a touch screen to the processor 120. For example, instructions or data received from the processor 120, the memory 130, the communication interface 160, and/or the message management module 170 through the bus 110 may be output through the input/output devices (e.g., speakers or displays). For example, the input/output interface 140 may output voice data processed by the processor 120 to a user through a speaker.

The display 150 may display various information (e.g., multimedia data, or text data) to a user.

The communication interface 160 may perform a communication connection between the electronic device 101 and external electronic devices (e.g., the electronic device 104, or the server 106). For example, the communication interface 160 may be connected with a network 162 through wireless communication or wired communication to communicate with the external electronic device. The wireless communication may include at least one of Wireless Fidelity (Wi-Fi), Wi-Fi Direct, BlueTooth (BT), Near Field Communication (NFC), a GPS, and/or cellular communication (e.g., LTE, LTE-A, CDMA, WCDMA, UMTS, WiBro, and/or GSM). The wired communication may include at least one of a Universal Serial Bus (USB), a High Definition Multimedia Interface (HDMI), recommended standard 232 (RS-232), and/or a Plain Old Telephone Service (POTS).

According to an embodiment, the network 162 may be telecommunication networks. The telecommunication networks may include at least one of a computer network, the Internet, the Internet of things, or a telephone network. According to an embodiment, protocols (a transport layer protocol, a data link layer protocol, or a physical layer protocol) for communication between the electronic device 101 and external electronic devices may be provided by at least one of the applications 134, the API 133, the middleware 132, the kernel 131, or the communication interface 160.

According to an embodiment, the message management module 170 may support the operation of the electronic device 101 by conducting at least one operation among operations (or functions) performed in the electronic device 101. For example, the server 106 may include a message management server module 108 capable of supporting the message management module 170 implemented in the electronic device 101. For example, the message management server module 108 may include at least one element of the message management module 170, and may perform (e.g., perform as a proxy) at least one of the operations performed by the message management module 170.

The message management module 170 may process at least some of the information obtained from other elements (e.g., the processor 120, the memory 130, the input/output interface 140, and/or the communication interface 160) and utilize the same in various manners. For example, the message management module 170 may control at least some functions of the electronic device 101 using the processor 120 or independently from the processor 120 so that the electronic device 101 may interwork with other electronic devices (e.g., the electronic device 104 and/or the server 106). The message management module 170 may be integrated with the processor 120. According to an embodiment, at least one element of the message management module 170 may be included in the server 106 (e.g., the message management server module 108) and supported with at least one operation that is performed in the message management module 170 from the server 106.

The message management module 170 may be a module in the electronic device 101. The message management module 170 may be a physical device such as Application-Specific Integrated Circuit (ASIC) chips or Field-Programmable Gate Arrays (FPGAs), and/or a software module comprised of at least one of the application 134, the API 133, the middleware 132 and/or the kernel 131 in the memory 130.

Figure 2:
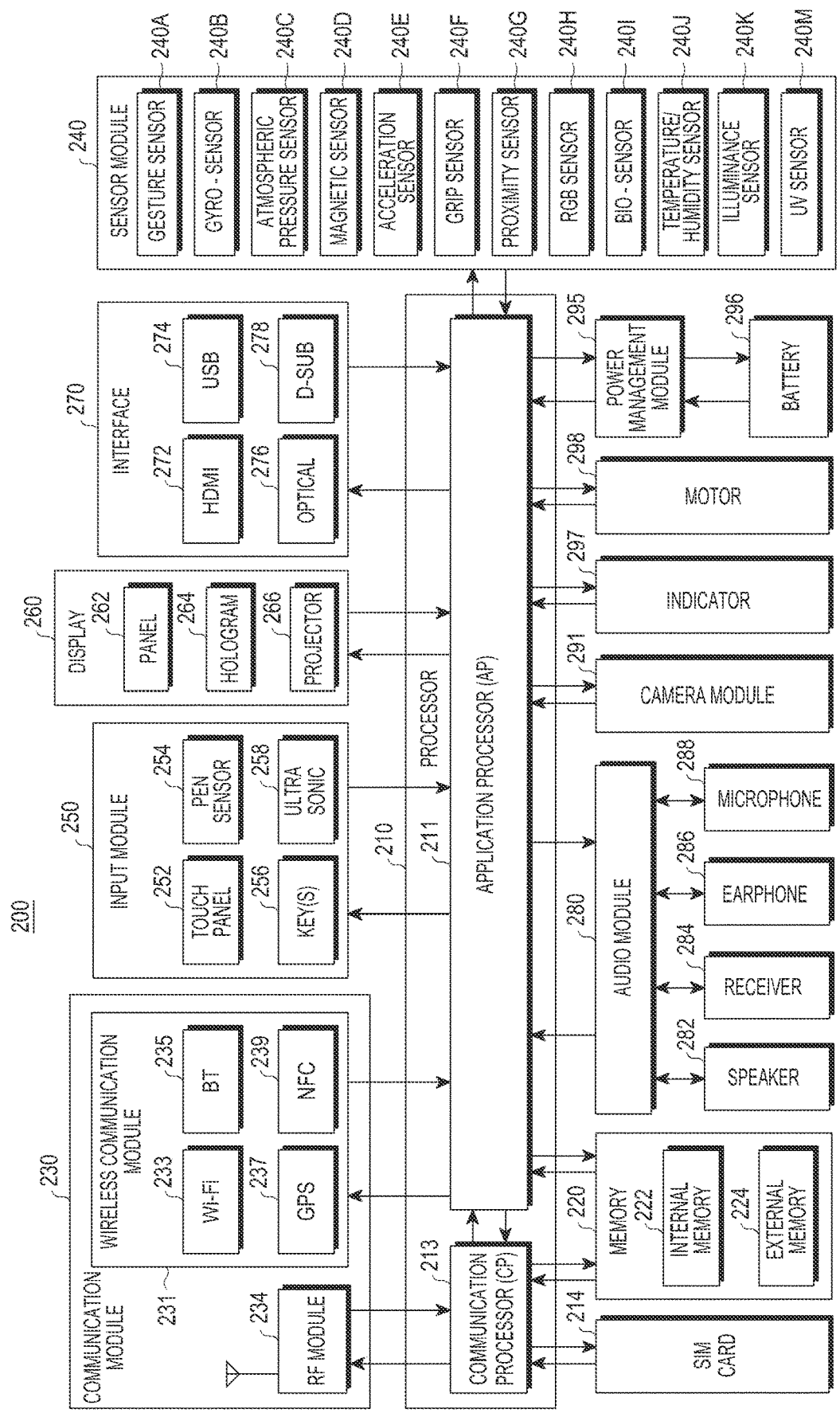
FIG. 2 is a block diagram illustrating hardware according to an embodiment of the present disclosure.

FIG. 2 is a block diagram illustrating hardware according to an embodiment of the present disclosure. The hardware may be, for example, an electronic device, as, for example, illustrated in FIG. 1.

Referring to FIG. 2, hardware 200 including at least one processor 210, a subscriber identification module card 214, a memory 220, a communication module 230, a sensor module 240, a user input module 250, a display module 260, an interface 270, an audio module (or an audio codec) 280, a camera module 291, a power management module 295, a battery 296, an indicator 297, and a motor 298 is illustrated.

The processor 210 may be, for example, a processor 120 as shown in FIG. 1. Although an Application Processor (AP) 211 and a Communication Processor (CP) 213 are included in the processor 210 in FIG. 2, the AP 211 and the CP 213 may be included in different IC packages, respectively.

According to an embodiment, the AP 211 and the CP 213 may be included in one IC package.

The AP 211 may control hardware or software elements connected with the AP 211 and perform processing of various data including multimedia data and calculation by performing an operating system or application programs. The AP 211 may be implemented with, for example, a System on Chip (SoC). According to an embodiment, the processor 210 may further include a Graphic Processing unit (GPU).

The CP 213 may manage data links and perform a function of changing communication protocols in communication between the electronic device (e.g., the electronic device 101) including the hardware 200 and an external electronic device connected with the electronic device. The CP 213 may be implemented by, for example, a SoC. According to an embodiment, the CP 213 may perform at least some of multimedia control functions. The CP 213 may perform identification and authentication of the electronic device in communication networks by using, for example, subscriber identification modules (e.g., SIM cards 214). In addition, the CP 213 may provide services such as voice calls, video calls, text messages, or packet data to a user.

Further, the CP 213 may control transmission and reception of data of the communication module 230. In FIG. 2, although elements such as the CP 213, the power management module 295 and the memory 220 are illustrated separately from the AP 211, according to an embodiment, the AP 211 may be implemented to include at least one (e.g., the CP 213) of the above-described elements.

According to an embodiment, the AP 211 or the CP 213 may load instructions or data received from at least one of a non-volatile memory or another element which is connected with the AP 211 or the CP 213 to a volatile memory and process the same. In addition, the AP 211 or the CP 213 may store data that is received or generated from or by at least one of the elements in a non-volatile memory.

The SIM card 214 may be a card adopting a subscriber identification module function, and be inserted into a slot formed at a predetermined portion of the electronic device. The SIM card 214 may include inherent identification information (e.g., an Integrated Circuit Card IDentifier (ICCID)) and/or subscriber information (e.g., an International Mobile Subscriber Identity (IMSI)).

The memory 220 (e.g., the memory 130) may include an internal memory 222 and/or an external memory 224. The memory 220 may be, for example, the memory 130 shown in FIG. 1. The internal memory 222 may include at least one of a volatile memory (e.g., a Dynamic RAM (DRAM), a Static RAM (SRAM), a Synchronous Dynamic RAM (SDRAM), or the like) or a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like). According to an embodiment, the internal memory 222 may be a Solid-State Drive (SSD). The external memory 224 may further include a flash drive, for example, a Compact Flash (CF), a Secure Digital (SD), a Micro Secure Digital (Micro-SD), a Mini Secure Digital (Mini-SD), an extreme Digital (xD), a Memory Stick, and/or the like.

The communication module 230 (e.g., the communication interface 160) may include a wireless communication module 231 and/or a Radio Frequency (RF) module 234. The wireless communication module 231 of the communication module 230 may include, for example, Wi-Fi 233, BT 235, GPS 237, and/or NFC 239. For example, the wireless communication module 231 may provide a wireless communication function by using wireless frequencies. Additionally and alternatively, the wireless communication module 231 may include network interfaces (e.g., Local Area Network LAN cards) or modems in order to connect the hardware 200 with networks (e.g., the Internet, a LAN, a Wire Area Network (WAN), a telecommunication network, a cellular network, a satellite network, a POTS, or the like).

The RF module 234 may perform transmission and reception of data, for example, RF signals or called electromagnetic signals. The RF module 234, although not shown, may include, for example, transceivers, Power Amp Modules (PAMs), frequency filters, Low Noise Amplifiers (LNA), and/or the like. Also, the RF module 234 may further include components, for example, conductors or cables for transmitting and receiving electromagnetic waves through a free space in wireless communication.

The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a Red-Green-Blue (RGB) sensor 240H, a bio-sensor 240I, a temperature/humidity sensor 240J, an illuminance sensor 240K, an ultra violet sensor 240M, and/or the like. The sensor module 240 may measure physical quantities and detect an operation state of the electronic device, to thereby convert the measured or detected information to electric signals. Additionally and alternatively, the sensor module 240 may include, for example, an E-nose sensor (not shown), an ElectroMyoGraphy sensor (EMG) (not shown), an ElectroEncephaloGram sensor (EEG) (not shown), an ElectroCardioGram sensor (ECG) (not shown), a fingerprint sensor, and/or the like. The sensor module 240 may further include a control circuit for controlling at least one sensor included in the sensor module 240.

The user input module 250 (e.g., the input/output interface 140) may include a touch panel 252, a (digital) pen sensor 254, keys 256, and/or an ultrasonic input device 258. The touch panel 252 may recognize a touch input by at least one of, for example, a capacitive type, a pressure type, an infrared type, and/or an ultrasonic type. In addition, the touch panel 252 may further include a controller (not shown). In a case of a capacitive type, the proximity as well as direct touches may be detected. The touch panel 252 may further include a tactile layer. In this case, the touch panel 252 may provide a user with a tactile reaction.

The (digital) pen sensor 254 may be implemented by using, for example, a method that is the same as or similar to a user's touch input, or a separate recognition sheet. As to the keys 256, for example, a keypad or touch keys may be used. The ultrasonic input device 258 detects acoustic waves with a microphone (e.g., a microphone 288) at the electronic device through a pen that generates ultrasonic signals to thereby identify data. The ultrasonic input device 258 may perform wireless recognition. According to an embodiment, the hardware 200 may receive a user input from external devices (e.g., networks, computers, or servers) which are connected with the communication module 230 by using the communication module 230.

The display module 260 (e.g., the display 150) may include a panel 262, a hologram 264 and/or a projector 266. The panel 262 may be, for example, a Liquid Crystal Displays (LCD), an Active-Matrix Organic Light-Emitting Diode (AM-OLED), and/or the like. The panel 262 may be implemented to be, for example, flexible, transparent or wearable. The panel 262 may be configured with the touch panel 252 as a single module. The hologram 262 may display 3D images in the air by using interference of light. According to an embodiment, the display module 260 may further include a control circuit for controlling the panel 262 or the hologram 264.

The interface 270 may include HDMI 272, USB interface 274, an optical interface 276, and/or a D-subminiature (D-sub) interface 278. Additionally or alternatively, the interface 270 may include, for example, a Secure Digital (SD)/Multi-Media Card (MMC) (not shown) or an Infrared Data Association (IrDA) (not shown).

The audio module 280 may convert voices to electric signals, and vice versa. The audio module 280 may convert voice information input or output through, for example, a speaker 282, a receiver 284, an earphone 286 and/or a microphone 288.

The camera module 291 is a device for photographing still and moving images, and may include at least one image sensor (e.g., a front lens or a rear lens), an Image Signal Processor (ISP) (not shown), or a flash LED (not shown) according to an embodiment.

The power management (control) module 295 may manage power of the hardware 200. Although not shown, the power management module 295 may include, for example, a Power Management Integrated Circuit (PMIC), a charger Integrated Circuit (IC), and/or a battery fuel gauge.

The PMIC may be mounted, for example, in integrated circuits or SoC semiconductors. The charging methods may be divided into a wired type and a wireless type. The charger IC may charge a battery and prevent inflow of excessive voltage or excessive current from a charger. According to an embodiment, the charger IC may include a charger IC for at least one of the wired charging type or the wireless charging type. The wireless charging type may encompass, for example, a magnetic resonance type, a magnetic induction type or an electromagnetic wave type, and additional circuits for wireless charging, for example, coil loops, resonance circuits, rectifiers, or the like may be added.

The battery fuel gauge may measure, for example, the remaining amount of battery, a charging voltage and current, or temperature. The battery 296 may generate and supply power, and may be, for example, a rechargeable battery.

The indicator 297 may display a predetermined state, for example, a booting state, a message state or a charging state of the whole or a part (e.g., the AP 211) of the hardware 200. The motor 298 may convert electric signals to a mechanical vibration. A Multipoint Control Unit (MCU) (not illustrated) may control the sensor module 240.

Although not shown, the hardware 200 may include a processing device (e.g., a GPU) for providing a mobile TV service. The processing device for providing a mobile TV service may process media data according to standards such as, for example, Digital Multimedia Broadcasting (DMB), Digital Video Broadcasting (DVB) or media flow. Each of the above-described elements of hardware according to the present disclosure may be configured with one or more components, and the names of the corresponding elements may be depend on the type of electronic device. The hardware according to the present disclosure may be configured by including at least one of the above-described elements, and some of the elements may be omitted, or other elements may be added. In addition, some of the elements of the hardware according to the present disclosure may be combined to a single entity that can perform the same functions as those of original elements.

The term "module" used in the present disclosure may mean a unit including one or more combinations of, for example, hardware, software or firmware. The "module" may be replaced with terms such as, for example, a unit, a logic, a logical block, a component, or a circuit. The "module" may be a minimum unit or a part thereof which perform one or more functions. The "module" may be implemented mechanically or electronically. For example, the "module" may include at least one of ASIC chips, FPGAs, or programmable-logic devices, which are well-known or will be developed in the future for performing predetermined operations.

Figure 3:
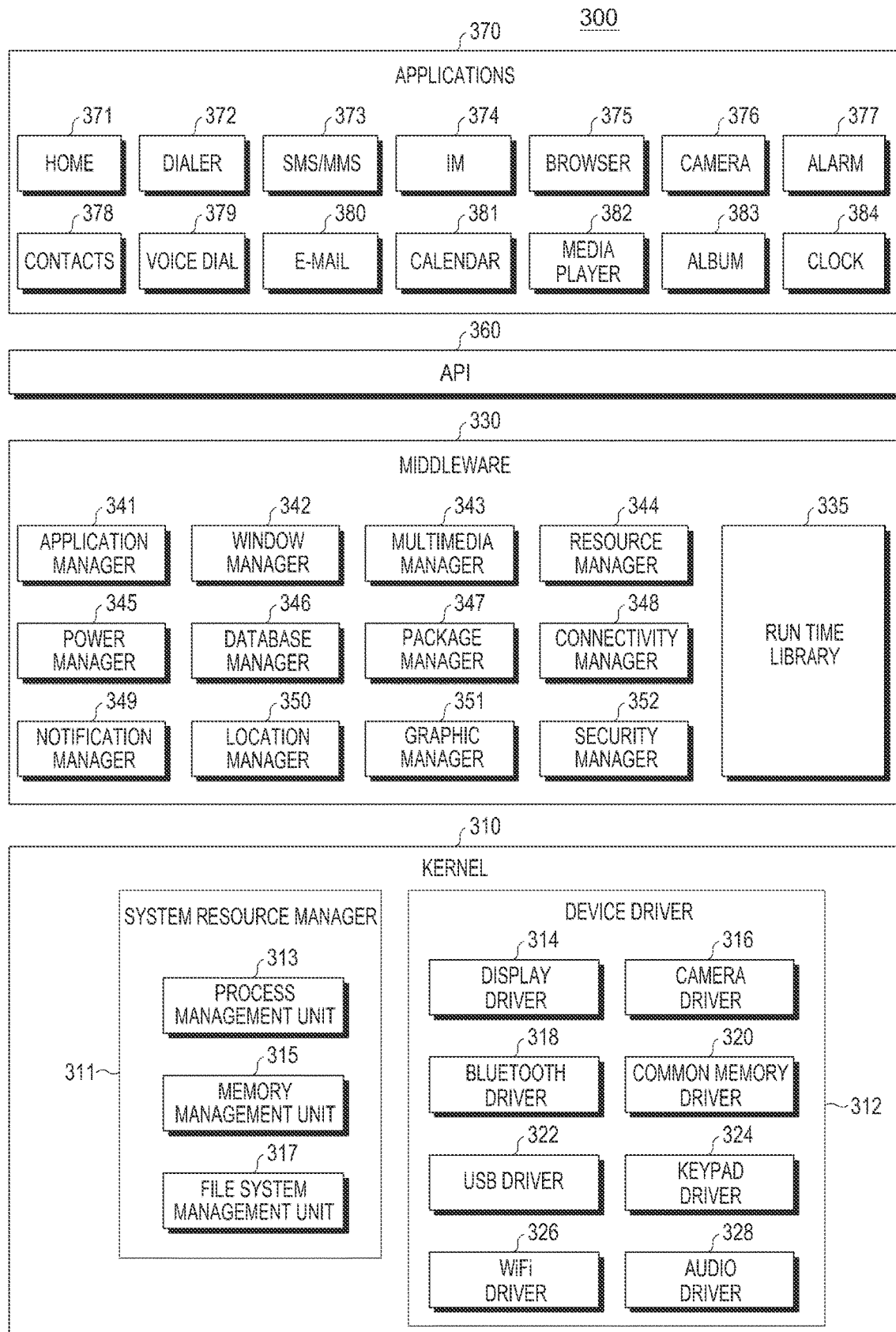
FIG. 3 is a block diagram illustrating a programming module according to an embodiment of the present disclosure.

FIG. 3 is a block diagram illustrating programming modules according to an embodiment of the present disclosure. The programming modules may be included (e.g., stored) in an electronic device (or a memory) as illustrated in FIG. 1. At least some of the programming modules may be configured with software, firmware, hardware, or a combination thereof. The programming modules may be implemented in hardware and include an Operating System (OS) for controlling resources related to the electronic device, or various applications performed under the operating system. For example, the operating system may be Android, iOS, Windows, Symbian, Tizen, Bada, or the like.

Referring to FIG. 3, programming modules 300 including a kernel 310, a middleware 330, an API 360, and/or applications 370 are illustrated.

The kernel 310 (e.g., the kernel 131) may include a system resource manager 311 and/or a device driver 312. The system resource manager 311 may include, for example, a process management unit 313, a memory management unit 315, and/or a file system management unit 317. The system resource manager 311 may perform the control, allocation or collection of the system resources. The device driver 312 may include, for example, a display driver 314, a camera driver 316, a Bluetooth driver 318, a common memory driver 320, a USB driver 322, a keypad driver 324, a Wi-Fi (WiFi) driver 326, and/or an audio driver 328. In addition, according to an embodiment, the device driver 312 may include an Inter-Process Communication (IPC) driver (not shown).

The middleware 330 may include a plurality of modules which have been implemented to provide functions required in common for the applications 370. Further, the middleware 330 may provide functions through the API 360 in order to allow the applications 370 to effectively use limited system resources in the electronic device. For example, as shown in FIG. 3, the middleware 330 (e.g., the middleware 132) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The run time library 335 may include a library module that, for example, a compiler uses in order to add new functions through programming language while the applications 370 are being performed. According to an embodiment, the run time library 335 may perform functions of an input/output, the management of a memory, or arithmetic calculation.

The application manager 341 may manage, for example, a life cycle of at least one application among the applications 370. The window manager 342 may manage a GUI resource used in the screen. The multimedia manager 343 may identify formats for reproducing various media files, and perform encoding or decoding of media files by using a codec corresponding to each format. The resource manager 344 may manage resources such as source codes, memories or storage spaces of at least one application among the applications 370.

The power manager 345 may manage a battery or power by operating together with a Basic Input/Output System (BIOS), and provide power information necessary for the operation. The database manager 346 may manage generating, searching or changing a database that is to be used in at least one among the applications 370. The package manager 347 may manage the installation or the updating of applications distributed in the form of package file.

The connectivity manager 348 may manage wireless connection of, for example, Wi-Fi or Bluetooth. The notification manager 349 may display or notify events such as received messages, appointments, and proximity notifications to a user without disturbance. The location manager 350 may manage location information of the electronic device. The graphic manager 351 may manage graphic effects to be provided to a user and user interfaces related to the graphic effects. The security manager 352 may provide a general security function required for system security or user authentication. According to an embodiment, with the electronic device (e.g., the electronic device 101) adopting a phone call function, the middleware 330 may further include a telephony manager (not shown) for managing functions of a voice call or a video call of the electronic device.

The middleware 330 may generate and use a new middleware module through a combination of various functions of the above-described internal element modules. The middleware 330 may provide modules specialized according to the type of operating system in order to provide differentiated functions. In addition, some typical elements may be dynamically removed from the middleware 330, or new elements may be added to the middleware 330. Accordingly, some elements described in the embodiment of the present disclosure may be omitted, or other elements may be added, and alternatively, some elements may be replaced with elements in different names which perform functions identical or similar to that of the some elements.

The API 360 (e.g., the API 133) is a group of API programming functions, and may be provided with a different configuration according to an operating system. For example, one set of APIs may be provided to each platform in a case of Android or iOS, and at least two sets of APIs may be provided to each platform in a case of Tizen.

The applications 370 (e.g., the applications 134) may include, for example, preloaded applications or third party applications. The applications 370 may include a home application 371, a dialer application 372, a SMS/MMS application 373, an instant messaging application 374, a browser application 375, a camera application 376, an alarm application 377, a contact (contacts) application 378, a voice dial application 379, an e-mail application 380, a calendar application 381, a media player application 382, an album application 383, a clock application 384, and/or the like.

At least a part of the programming modules 300 may be implemented by instructions stored in a computer-readable storage medium. When the instructions are performed by at least one processor (e.g., the processor 210), the at least one processor may perform functions corresponding to the instructions. The computer-readable storage medium may be, for example, the memory 220. At least some of the programming modules 300 may be implemented (e.g., performed) by, for example, the processor 210. At least some of the programming modules 300 may include, for example, modules, programs, routines, sets of instructions and/or processes for performing at least one function. Names of elements of the programming modules 300 according to the present disclosure may be changed depending on the type of operating system. The programming modules 300 according to the present disclosure may include one or more elements among the above-described elements, exclude some of them, or further include other elements. Operations performed by the programming modules 300 or other elements according to the present disclosure may be processed sequentially, concurrently, repeatedly or heuristically, and some operations may be omitted, or other operations may be added.

Figure 4:
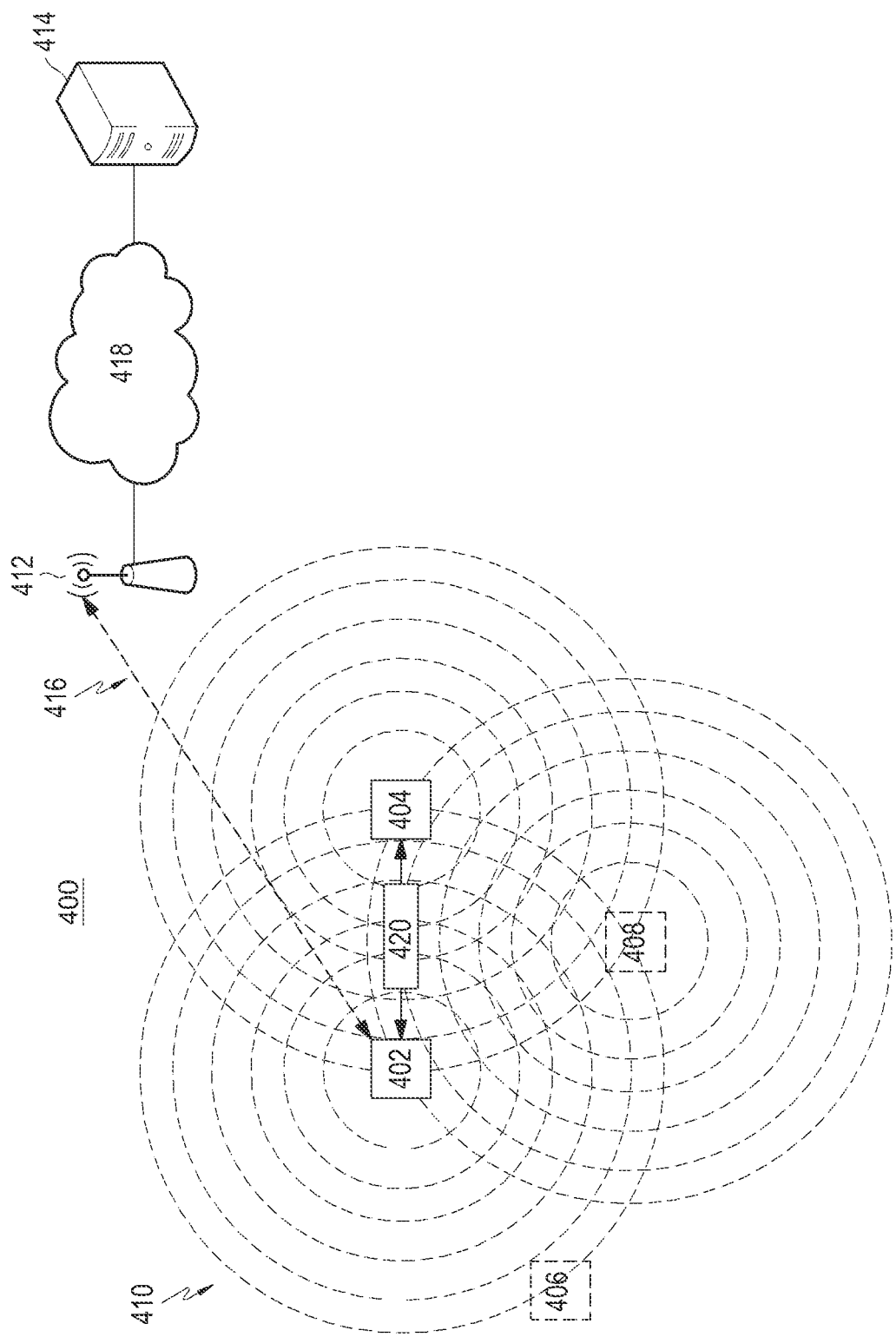
FIG. 4 is a block diagram illustrating a communication system according to an embodiment of the present disclosure.

FIG. 4 is a block diagram illustrating a communication system according to an embodiment of the present disclosure.

Referring to FIG. 4, a communication system 400 including an electronic device 402, an electronic device 404, an electronic device 406, an electronic device 408, a wireless access device 412, a server 414 and/or a network 418 is illustrated. Any one of the electronic devices 402, 404, 406 and 408 may be, for example, the electronic device 101.

The electronic devices 402, 404, 406 and 408 may transmit or receive messages to or from each other. The electronic devices 402, 404, 406 and 408 may transmit or receive messages through, for example, radio waves 410 when transmitting or receiving messages. The electronic devices 402, 404, 406 and 408 may transmit messages by a user's request. The electronic devices 402, 404, 406 and 408 may transmit messages when at least one of a specific location and/or time is satisfied. At least one of the specific location and/or time may be determined according to the content stored in a memory or information received from other electronic devices 402, 404, 406 and 408. At least one of the specific location and/or time may be determined according to information received from the server 414 through the wireless access device 412. Messages may not be transmitted when at least one of the specific location or time is not satisfied. The electronic devices 402, 404, 406 and 408 may periodically transmit information for a specific time based on external information or messages.

In order to transfer the messages, an electronic device (e.g., the electronic device 402) to transmit messages may be connected with another electronic device (e.g., the electronic device 404, 406 or 408) or may not be connected therewith. When the electronic device (e.g., the electronic device 402) is not connected with another electronic device (e.g., the electronic devices 404, 406 or 408), messages may be transmitted by, for example, a broadcasting channel. The broadcasting channel may refer to the range of radio waves and/or a broadcasting channel by which the electronic devices (e.g., the electronic devices 402, 404, 406 or 408) may interpret information based on predetermined information all the time. The broadcasting channel may refer to the range of radio waves and/or a broadcasting channel known to all of the electronic devices (e.g., the electronic devices 402, 404, 406 or 408) so that any one of the electronic devices (e.g., the electronic devices 402, 404, 406 or 408) can transmit a message through the broadcasting channel and the others of the electronic devices (e.g., the electronic devices 402, 404, 406 or 408) can receive the message through the broadcasting channel. The radio waves 410 may be Wi-Fi, BT, NFC, Cellular, Infrared Radiation (IR), or the like which are used in various communication methods. When the electronic device (e.g., the electronic device 402) is connected with another electronic device (e.g., the electronic device 404, 406 or 408), messages may be transmitted, for example, through a dedicated channel that is formed by pairing the electronic device (e.g., the electronic device 402) with the electronic device (e.g., the electronic device 404, 406 or 408).

The electronic device (e.g., the electronic device 402) may transmit messages with a receiver of the message designated or not designated. Even though a message is transmitted to a designated receiver, when the message is transmitted through a broadcasting channel, an electronic device that is not designated as a receiver may receive and identify the message.

The messages may include various contents (e.g., information on goods to be sold, a sale place, sale time, information on sale price, or the like). For example, the electronic device 402 may transmit the message that is not designated with a receiver through the broadcasting channel with the radio waves 410. The electronic device 404 and the electronic device 406 may receive the radio waves 410 and identify the message. The electronic device 406 may analyze the content of the identified message and then may not respond to the message.

The electronic device 404 may analyze the message received from the electronic device 402 and determine whether or not to generate a response message. The response message may include a content (e.g., purchase intent, a purchase price, or the like) corresponding to the content of the received message. The electronic device 404 may designate the electronic device 402 as a receiver and transmit a response message to the electronic device 402 though the broadcasting channel by the radio waves 410. At least one of the electronic device 402, the electronic device 406 and the electronic device 408 may receive the response message, and recognize the message carried by the radio waves 410. The electronic device 406 may identify that the electronic device 406 is not the receiver for the response message to thereby disregard the message. The electronic device 402 may identify that the electronic device 402 is the receiver for the response message to thereby analyze the message. The electronic device 402 and the electronic device 404 may transmit and receive messages through the broadcasting channel more than once.

The electronic devices 402, 404, 406 and 408 may transmit and receive messages 420 in an authenticated manner with each other. For example, the electronic device 402 and the electronic device 404, which are to be determined to authenticate, may transmit messages authenticated according to a predetermined authentication method to each other, and receive response messages of the authenticated messages from each other. The authentication may be conducted by an authentication method between the electronic devices or by an authentication server 414. The authentication server 414 may communicate with the electronic devices through a network 418. For example, the electronic device 402 may transmit and receive authentication information to and from the authentication server 414 through the wireless access device 412 connected with the network 418. According to an embodiment, the wireless access device 412 may be implemented to include at least some of functions of the authentication server 414. The authentication server 414 may be connected to the network 418 in wired and/or wireless communication.

The electronic devices 402, 404, 406 and 408 may designate a receiver in the messages 420 transmitted and received in the authenticated method to thereby transmit the messages through a predetermined channel. For example, the electronic device 402 may generate an authenticated message with the electronic device 404 designated as the receiver and transmit the same through a predetermined channel. Wireless resources for transmitting through the predetermined channel may be allocated to the electronic device 402 and the electronic device 404 by the wireless access device 412. The electronic device 404 may receive the authenticated message by the radio waves 410 transmitted through the designated channel. The electronic device 404 may identify that the receiver of the authenticated message is the electronic device 404 to thereby identify the content of the received authenticated message.

The electronic device 404 that has received the authenticated message transmitted by the electronic device 402 may transmit another authenticated message 420 in which the electronic device 402 is designated as a receiver through a predetermined channel. The electronic device 402 may receive the authenticated message transmitted by the electronic device 404, and identify that a receiver of the received and authenticated message is the electronic device 402. The electronic devices 402, 404, 406 and 408 according to an embodiment of the present disclosure may receive authenticated messages more than once.

Although the electronic device 406 may receive the authenticated message or the authenticated message 420, the electronic device 406 cannot analyze the messages because it is not involved in the authentication process between the electronic device 402 and the electronic device 404.

The radio waves 410 may be generated by the electronic device 402, the electronic device 404, the electronic device 406, or the electronic device 408. The radio waves 410 may be generated by a communication module (e.g., the communication module 230) of the electronic device 402, and the communication module may be at least one of, for example, the communication processor 213 or the wireless communication module 231.

According to an embodiment of the present disclosure, the electronic devices 402, 404, 406 and 408 may transfer the received messages to other electronic devices. For example, the electronic device 408 may receive a message from the electronic device 402 and relay the received message to the electronic device 404. The electronic device 402 may transmit the message, and play a role of relaying the message. A receiver of the message may be the electronic device 404, or may not be designated in the broadcasting channel. The electronic device 408 may be out of range of the radio waves 410 from the electronic device 402. The electronic device 404 may relay messages received from the electronic device 408 to the electronic device 402. A method of determining the relay will be described later.

In the electronic devices transferring the received messages, the received messages may be manipulated. Manipulation of messages may include, for example, merging the received messages and other messages, correcting the received messages and/or deleting the received messages. The manipulation of messages may be conducted based on, for example, information included in the received messages, a state of an electronic device that transfers messages (or receives messages), a state of an electronic device that initially transmits messages, a state of an electronic device to receive messages, and/or the intensity of signal (e.g., the radio wave 410) that is a means for transferring messages.

The wireless access device 412 may include a device that support Wi-Fi, BT, NFC, and/or Cellular (2G, 3G, LTE, LTE-A, WiBro, or the like).

The network 418 may be a LAN, a WAN, a telecommunication network, a cellular network (e.g., 2G, 3G, LTE, LTE-A, or the like), a satellite network, or a POTS.

The server 414 may be an authentication server, a data management server, and/or an identifier generation server, which means that the electronic devices 402, 404, 406 and 408 may receive information from servers through the network 418, and that the server 414 is not merely one specific server but represents servers.

Figure 5:
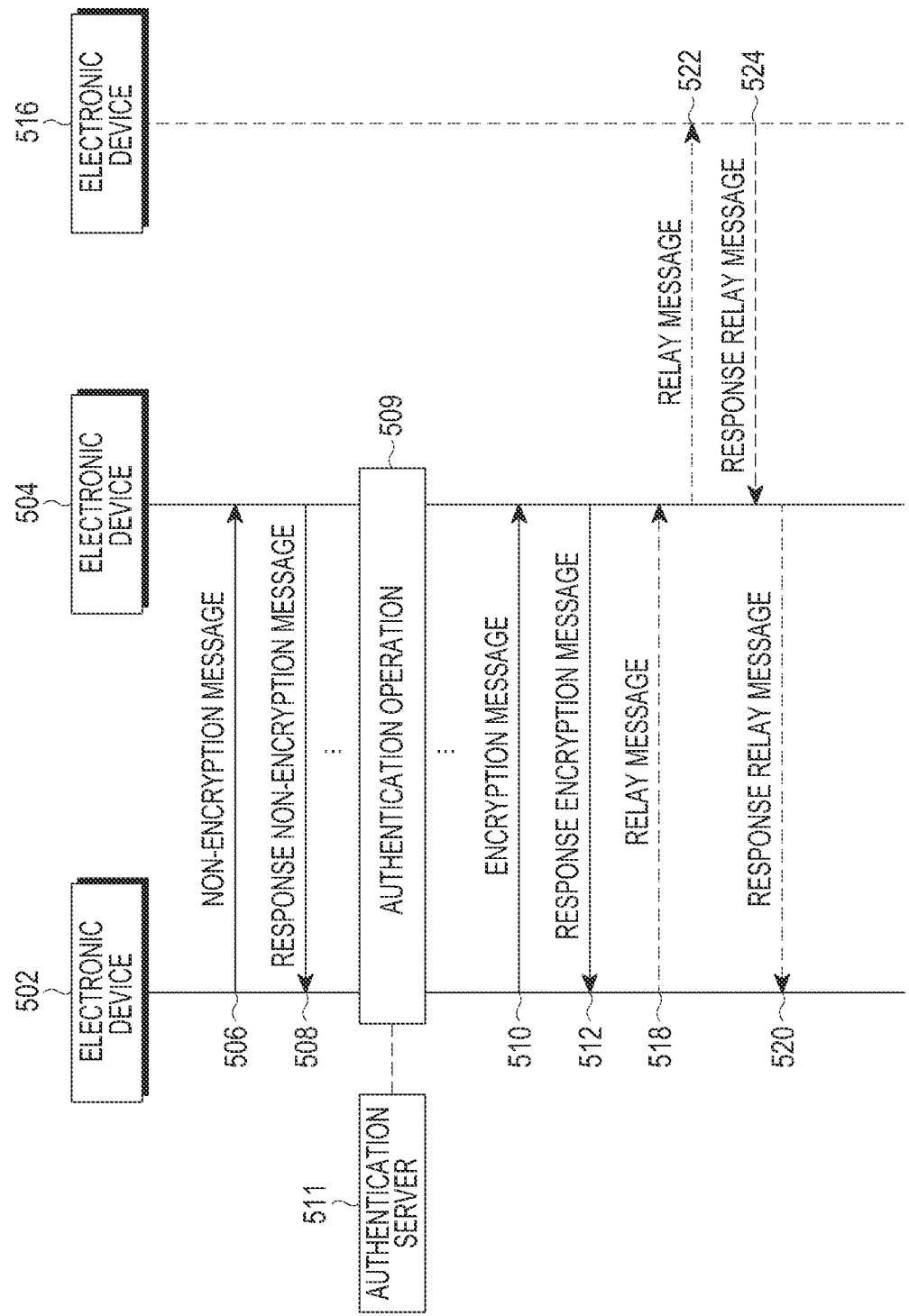
FIG. 5 is a procedure block diagram illustrating transmission or reception of messages between electronic devices including a message management module according to an embodiment of the present disclosure.

FIG. 5 is a sequence diagram illustrating a method for transmitting or receiving messages between electronic devices including a message management module according to an embodiment of the present disclosure.

Referring to FIG. 5, an example of communication of electronic devices 502, 504 or 516 including a message management module is illustrated. However, the present disclosure is not limited to this illustration of FIG. 5. Communication between various types of electronic devices or a plurality of message management modules can be made. The message management module may be, for example, the electronic device 101 or a module (e.g., the message management module 170) included in the electronic device (e.g., the electronic device 101). Each of the electronic device 402, the electronic device 404, the electronic device 406, and the electronic device 408 of FIG. 4 may include the message management module.

A non-encryption message 506 and a response non-encryption message 508 may be messages transmitted by a normal text that is not encrypted. The non-encryption message may be a message of the broadcasting channel, which is sent from the electronic device 502 to the electronic device 504.

The message management module may conduct at least one operation of storing message information, configuring message transmission, generating messages, analyzing messages, deleting messages, merging messages, changing messages, determining transfers of messages, and external notification.

The message management module may store information received by a user's input. According to an embodiment, the message management module may receive and store, for example, product-related information when a user wishes to sell a predetermined product. In addition, the message management module may receive and store information received not by a user's input but from other electronic devices. For example, the message management module may receive and store information on products which are sold by a user of other electronic devices. The message management module may process the received and/or input information and store the same in a memory (e.g., the memory 130) of the electronic device. The information to be stored may be information of the message management module as well as message information. For example, the message management module may store information on transmission time and/or a transmission location of messages. The messages may be processed and stored by an internal operation of the message management module. For example, the messages may be merged or compressed to be thereby stored. A method of merging and compressing messages will be described later.

The message management module may configure information related to message transmission. The information of message transmission may include a condition in which the message management module transmits messages when transaction information such as, for example, time or a location, is satisfied according to an embodiment. For example, the message management module may configure that a message including information on products to be sold is transmitted at specific time. In addition or alternatively, the message management module may be configured to transmit a message including information on products to be sold at a specific place or in a specific area. For example, the message management module may be configured to transmit a message in an area where at least one wireless access device (e.g., the wireless access device 412) is available to be connected with the message management module. In addition or alternatively, the message management module may configure that information on products to be purchased is stored to be thereby transmitted when the information on products to be purchased is identified in a received message.

The message management module may transmit messages with information included therein. The information may be at least one piece of transaction information according to an embodiment such as, for example, a product type, sale price, a transaction IDentification (ID), transaction available time information, transaction available place information, message transmission time range information, message transmission location range information, message valid period information, transaction credit information, transaction security, network stability, identifiers of the electronic devices, or the number of times for valid relays. The information may be forms of text, images, sounds, or movies.

The message management module may delete messages. The messages to be deleted may be stored messages or received messages. The messages may be deleted when a predetermined condition is not satisfied. In the transaction information according to an embodiment, for example, when the message valid period among information included in the stored messages expires, the message may be deleted. In addition or alternatively, when the number of times for valid relays among information included in the messages to be deleted is exceeded, and/or an identifier of a transmitting electronic device, which is included in the message that does not have a message relay option, is different from an identifier of an electronic device including the message management module, the message management module may delete the message. In addition or alternatively, if an identifier of a transmitting electronic device is included in a received message, the message management module may check an effective value of the transmitting electronic device identifier and delete the message when the value is not valid. The identifier will be described in detail later.

The message management module may determine whether messages are transmitted. Additional information related to an operation of the message management module in determining transmission of messages may be provided with reference to FIG. 7 described later. The message management module may merge messages. In the transaction information according to an embodiment, for example, the message management module may merge at least two messages into one message. For example, when two messages received by the message management module contain the same product information with different price, respectively, the message management module may merge the two messages into one while separately displaying identifier information of a transmitting electronic device and sales price information. In addition or alternatively, if the bandwidth of a transmitting channel is enough to transmit two or more messages, the message management module may merge two received messages into one message without changing information included in the messages.

According to an embodiment, if a first received message and a second received message contain a different content from each other, the message management module may selectively merge at least some of the first message and at least some of the second message to generate a third message. In selecting at least some of the first message and at least some of the second message, the message management module may refer to the priority of messages included in the first message or the second message. For example, the first message may include the first content of the first priority and the second content of the second priority, and the second message may include the third content of the first priority and the fourth content of the second priority. The message management module may select and merge the first content of the first priority and the third content of the first priority to generate a third message.

According to an embodiment, the message management module may selectively merge messages. For example, if a condition for merging messages is satisfied, the message management module may merge messages. For example, the message management module may selectively merge messages based on the number of messages received for a predetermined time, information included in received messages, an environment of network (e.g., the presence of collision or congestion), a request of a wireless access device, a request of another electronic device, a power state of an electronic device or other electronic devices, or the like.

The message management module may change messages. In relation to transaction information according to an embodiment, for example, the message management module may compress messages according to at least one predetermined condition to adjust the amount of information to be transmitted. For example, when a state of bandwidth of a channel between the electronic device including the message management module and the other electronic device to receive a message is less than a predetermined reference value, or the error rate of transmission and reception data of physical and/or logical communication is high, the message management module may compress text information or increase the compression ratio of images and/or moving images to be thereby transmitted. In addition or alternatively, the message management module may divide the merged message into two or more messages and transmit the same more than once. In addition and alternatively, the message management module may change a message to be added with the number of times of transferring to be thereby transmitted. In addition and alternatively, the message management module may change at least some of the message based on information contained in the message. For example, in a case of a message that has a low reliability (user information that is decided by an authentication server or a reliability management server based on normally transacted products and received by the electronic device to be thereby included in the message) among product transaction information included in the message, the message management module may delete most of the message except for essential transaction information (e.g., product name, price, the reliability information).

The message management module may inform a user when messages are received. In addition or alternatively, the message management module may be configured to inform other electronic devices of reception of messages when messages are received. The message management module may inform all the received messages or some of them based on information set by a user. For example, the message management module may inform a user and/or other electronic devices of at least one piece of information such as, product name, trademark of product, the type of product, sales price, a selling place, a selling time, or the like. The message management module may configure not to inform a user and/or other electronic devices based on set information. For example, the message management module may be configured not to inform a user and/or other electronic devices of information related to a transaction server, products that a user sets as a prohibition word, products set not to be accepted in personal information of a user, or the like. A user may be informed by using at least one of, for example, the speaker 282, the microphone 288, the indicator 297, and the display module 260. In addition or alternatively, notification messages may be transferred to other electronic devices through, for example, the communication module 230.

The message management module may identify an identifier (e.g., an anonymous identifier) of the electronic device including the message management module and allow the identifier of the electronic device to be included in the message. The identifier (e.g., the anonymous identifier) may be generated by, for example, the message management module, or received through an identifier generation management server (e.g., the server 414) or a base station (e.g., the wireless access device 412). The unique identifier may be generated within a predetermined distance from the electronic device or within a predetermined number of times for transmission. The message management module may receive the message including the identifier and determine whether the identifier of the message is valid to delete the message with an invalid identifier. For example, the validity of the identifier is based on information that is contained in the generation of the identifier or separately stored information, and if the electronic device does not satisfy at least one of a designated location or time, the message may be determined to be invalid to be thereby deleted.

The identifiers (e.g., anonymous identifiers) may be generated by using at least one of, for example, a hash function and a pseudo-random number algorithm. The identifiers may be generated using at least one of time, latitude, longitude, a One-Time Password (OTP), a Media Access Control (MAC) address, an Internet Protocol (IP) address, International Mobile Station Equipment Identity (IMEI), an authorized certificate, an authentication key, a telephone number, an e-mail, the social security number, resident registration number, the I-pin, an SNS ID, a unique serial number ICCID of a Subscriber Identity Module (SIM), International Mobile Subscriber Identity (IMSI), transaction product information, transaction time information, transaction location information, a MAC address or Service Set Identification (SSID) of an access point detected by or connected with the electronic device, or a cell ID detected by or connected with the electronic device. The identifier may be used to scramble a designated channel when transmitting the message 420 through the designated channel.

According to an embodiment of the present disclosure, the identifier may be a temporary identifier or a permanent identifier. The temporary identifier may be changed according to time and/or location of the electronic device. The temporary identifier may have a unique value at a specific time and/or in a predetermined area, while it may have a duplicate value at a different time and/or in a different area. When a temporary identifier that overlaps with the temporary identifier of the electronic device is received at a specific time and in a predetermined area, the temporary identifier may be changed according to priority (e.g., an earlier generated identifier). The temporary identifier may be generated and managed in the message management module or the server related to the temporary identifier.

According to an embodiments the permanent identifier may be generated and managed in a server related to the permanent identifier. When a server manages operations of the message management module, the server may configure permanent identifiers to have values which do not overlap with each other between the electronic devices registered in the server. For example, the identifier may be used for identifying messages in the broadcasting channel in a case of exchanging price negotiation messages between a seller and a buyer.

According to an embodiment, messages may not be transmitted from the electronic device by determining a valid value of the identifier. For example, the valid value of the identifier may be determined by checking whether the electronic device exists at a specific time and/or in a predetermined area. In addition, whether the permanent identifier or the temporary identifier generated in the server is valid may be determined by the server, and the electronic device receives a result of the determination from the server. If the identifier is not valid, and the electronic device is about to transmit a message, the electronic device may allow the message not to be transmitted. When the identifier is not valid, an identifier may be generated again. The new identifier may be generated in the same way as the above-described identifier.

According to an embodiment of the present disclosure, electronic devices may operate as follows. Hereinafter, the present disclosure will be described by an example of exchanging messages for selling products with reference to FIG. 5, and the present disclosure is not limited to this, but may be applied to other situations such as, for example, a situation of reaching an agreement in order to find a nearby designated place, a situation of requesting a rescue in an emergency and checking a rescue point, a situation of inducing a person to the advertiser's shop through an advertisement.

The electronic device 502 including the message management module may store information. For example, the electronic device 502 may receive information on products to be sold from a user and store the same. The electronic device 502 may store additional information related to the information. For example, the information on products to be sold may be stored along with at least one of transmission time or transmission place received from a user. The electronic device 502 may allow the information on products to be sold to be included in a non-encryption message 506 according to the transmission time or the transmission place and transmit the same. The non-encryption message 506 may be transmitted through a broadcasting channel, and/or transmitted to a designated electronic device.

The electronic device 504 including the message management module may receive a non-encryption message 506 transmitted from the electronic device 502 including the message management module. The electronic device 504 may extract and/or analyze information included in the received non-encryption message 506. For example, the electronic device 504 may extract and/or analyze information of products to be sold from the received non-encryption message 506 by using the message management module of the electronic device 504. The electronic device 504 may inform a user of the information. For example, the electronic device 504 may display information of products extracted from the non-encryption message 506 to be provided to a user. The electronic device 504 may selectively provide the information to a user. For example, the electronic device 504 may selectively display information that is set as interest product information. For example, if a user registers information on home appliances such as, TVs, audios, computers, or the like that the user is interested in to an interest list, the electronic device 504 may check product information of the received message to determine whether the product information is related to the home appliances, and if it is related to the home appliances, display the information to the user.

The electronic device 504 may receive, from a user of the electronic device 504, response information with respect to the information extracted from the non-encryption message 506 and store the response information. For example, a user of the electronic device 504 may input the response information such as product purchase price, purchase time, and/or a purchase place for negotiation to a purchase condition based on information displayed by the electronic device 504. The response information is not limited to this, and the electronic device 504 may store at least one of the input information and/or additional information as the response information.

The electronic device 504 may generate a response non-encryption message 508 based on the response information. For example, a message management module of the electronic device 504 may generate a response non-encryption message 508 including the response information, in which an identifier of a transmitter is the electronic device 504, and an identifier of a receiver is the electronic device 502. The electronic device 504 may transmit the response non-encryption message 508 to the electronic device 502 in response to the non-encryption message 506. The non-encryption message 506 may be transmitted through a broadcasting channel.

The electronic device 502 may receive the response non-encryption message 508. The electronic device 502 including the message management module may identify that the received response non-encryption message 508 is the message that the electronic device 502 is to receive by means of a receiving identifier of the received response non-encryption message 506. The electronic device 502 may extract and analyze information of the message. The electronic device 502 generate and transmit a message in response to the message 508 based on the identifier of the received response non-encryption message 508. For example, if the desired purchase price of the information transmitted through a message by a user of the electronic device 504 is not the same as the desired sales price of a user of the electronic device 502, the user may adjust the desired sales price and transmit the same again. The electronic device 502 and the electronic device 504 may repeat the above operations more than once.

The electronic device 502 and the electronic device 504 may generate and manage a communication session when they transmit messages through the non-encryption message 506 and the response non-encryption message 508. The communication session may be generated when the electronic device 502 transmits the non-encryption message 506, and the electronic device 504 transmits the response non-encryption message 508 with the temporary identifier of the electronic device 502 included in response to the non-encryption message 506. The generation of the communication session may be determined after the non-encryption message 506 and the response non-encryption message 508 are transmitted and received several times. The communication session may generate and manage the same communication session identifier in the electronic device 502 and the electronic device 504. The communication session identifier may be determined and generated by at least one of the electronic devices 502 and 504. The communication session may be terminated by at least one of the electronic device 502 and the electronic device 504, and in this case, the communication session identifier may be deleted.

Users of the electronic devices may perform a secure authentication operation 509 based on transmission and reception of the electronic devices. The electronic device 502 may check credit through the non-encryption message 506 and the response non-encryption message 508 with the electronic device 504, and determine to transmit and receive messages based on credit information. For example, the message management module of the electronic device 502 may determine an agreement about product price with the message management module of the electronic device 504 by at least one transmission and reception of the non-encryption message.

The electronic device 502 may perform the authentication operation 509 with the electronic device 504 through the authentication server 511 (e.g., the server 414). Transmission and reception of messages to and from the authentication server 511 may be made to perform mutual authentication operations for protecting credit information in a real name transaction, electronic commerce, a direct transaction, or the like. The electronic device 502 may transmit at least one of a temporary identifier of the electronic device 502, a temporary identifier of the electronic device 504, a permanent identifier of the electronic device 502, or the communication session identifier to the authentication server 511. The electronic device 504 may transmit at least one of a temporary identifier of the electronic device 504, a temporary identifier of the electronic device 502, a permanent identifier of the electronic device 504, or the communication session identifier to the authentication server 511. The authentication server 511 may perform an authentication operation with respect to the two electronic devices based on at least one of the permanent identifiers of the electronic devices, the temporary identifiers of the electronic devices or the communication session identifier. Each electronic device may identify that the authentication operation may be performed through the authentication server 511 by using permanent identifier of each electronic device. The authentication operation of the authentication server 511 may be conducted in various ways such as an authentication method using a key, an authentication method using a password, or the like. The electronic device 502 and the electronic device 504 may obtain a key or a seed for encrypting messages through the authentication operation.

The message management module of the electronic device 502 may generate an encryption message 510 that is encrypted through the authentication operation and transmit the same to the electronic device 504. The message management module of the electronic device 504 may receive the encryption message 510, and generate a response encryption message 512 in response to the message to be thereby transmitted to the electronic device 504. The encryption operation will be described in detail later with reference to FIG. 6. The encryption message 510 and the response encryption message 512 may be transmitted and received several times. The encryption message 510 and the response encryption message 512 may include credit information of the message management module.

The message management module of the electronic device 504 may transfer a relay message 518 that is generated or transferred by the message management module of the electronic device 502. The relay message 518 may be configured with information in order to be transmitted. The message management module of the electronic device 504 may be configured to transmit messages. The relay message 518 may include or may not include an identifier of an electronic device to receive. The message 518 may be encrypted or may not be encrypted. The message management module of the electronic device 504 may determine transmission of messages based on at least one of information included in the transferred relay message 518, transmission environment and/or setup values stored in the message management module. A transferred relay message 522 may be the relay message 518 transferred by the electronic device 502. The relay message 522 may include the same information as that of the message 518. The information of the relay message 522 may be transferred by compressing and changing the information of the relay message 518. In transferring the relay message 522, if the transfer environment does not reach the reference value, or unnecessary information is included in the relay message 518 (e.g., when advertisement information except for product information is detected by a spam filter of the electronic device), the message management module of the electronic device 504 may reduce or compress the content of the relay message 518 to be thereby transmitted.

When the message management module of the electronic device 504 determines to transfer messages, a compensation value may be accumulated in the transferring electronic device 504. The electronic device 504 may perform necessary services through the accumulated compensation value. For example, if the operation of receiving the permanent identifiers from the server is not free, the charge may be reduced (for example, by deducting the compensation value from the charge) or the period of using the permanent identifier may be extended based on the compensation value.

The transferred relay message 522 may be stored in the message management module of the electronic device 516. The reception identifier of the relay message 522 may be the electronic device 516. In this case, the electronic device 516 may identify that the reception identifier is the electronic device 516 and may not transfer the message any more.

The relay message 522 may include information showing whether a response message is necessary or not. When the relay message 522 includes information stating that a response message is not necessary, the message management module of the electronic device 516 may not transfer a response relay message 524. When the relay message 522 includes information stating that a response message is necessary, the message management module of the electronic device 516 may transfer the response relay message 524 stating that the message 522 has been received.

The message management module of other electronic devices receiving the response relay message 524 may be configured not to transfer the relay message 518 to the electronic device 516 upon receiving the relay message 518. For example, in a case of the relay message 518 that is relayed through one or more electronic device, when the electronic device 504 relay the message first, and the relay message 522 is received in circumstances that other electronic devices are about to relay the message to the electronic device 516, the relay message 518 may not be transferred to the electronic device 516.

The response relay message 524 may be transferred, so the electronic device 502 may identify the message through a response relay message 520. Alternatively, the response relay message 524 may be transferred to the electronic device 502 without a relay. For example, the electronic device 502 stays within the range of a signal transmitted from the electronic device 516, the response relay message 524 may be directly transferred to the electronic device 502. In addition or alternatively, the electronic device 502 does not stay within the range of a signal transmitted from the electronic device 516, but stays within the range of a signal transmitted from the electronic device 504, the response relay message may be transferred to the electronic device 504, and then the electronic device 504 may transfer the response relay message 520 to the electronic device 502.

If the relay message 522 has no reception identifier or has information stating that a response message is not necessary, the response relay message 524 may not be transferred.

Figure 6:
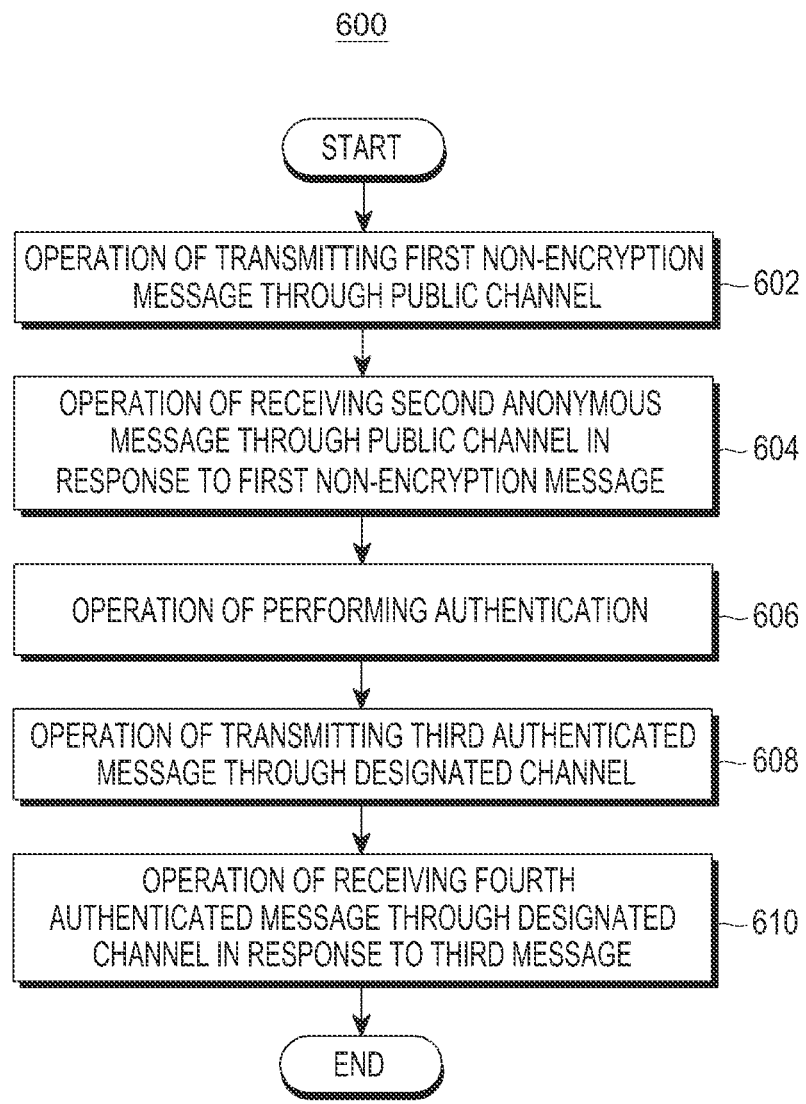
FIG. 6 is a flowchart illustrating transmission or reception of messages of an electronic device according to an embodiment of the present disclosure.

FIG. 6 is a flowchart illustrating transmission or reception of messages of an electronic device according to an embodiment of the present disclosure.

Referring to FIG. 6, a flowchart 600 showing operations carried out by, for example, an electronic device 101 is illustrated. An electronic device performing the operations of the flowchart 600 may include a transmitting module for transmitting messages and a receiving module for receiving messages. The transmitting module and the receiving module may be, for example, the communication interface 160.

In a non-encryption message operation 602, the electronic device may transmit a (first) non-encryption message. The non-encryption message may be transmitted through a (public) broadcasting channel, and can be interpreted by any other electronic device that receives the message. The non-encryption message may be generated in the electronic device, or received from other electronic devices. The non-encryption message can be made by a seller or a buyer.

For example, in a case of a non-encryption message made by a seller, the electronic device may allow the message to include at least one of input sales price, selling place and/or time. For example, in a case of a buyer's message, the electronic device may allow the message to include at least one of purchase product information, desired purchase price for the product, a desired purchase place and/or time. Alternatively, the transmitting operation may be configured to be performed at a specific time and a specific place.

In operation 604, a (second) non-encryption (anonymous) message may be received in response to the non-encryption message transmitted in the operation of 602. This non-encryption message may be transmitted through the (public) broadcasting channel. For example, the response non-encryption message may be a response message when the transmitted message in the operation of 602 is a seller's message, and may be a response message when the transmitted message in the operation of 602 is a buyer's message. One or more response message may be received.

Based on information included in the received response message, the performance of transaction in response to the response message may be determined. The transaction may not be limited to purchase or sales, but include various information exchange operations. For example, if the message transmitted in the operation of 602 is a seller's message, a buyer to transact may be determined based on information included in the received response message. The received response message may include information such as, for example, buyer's credit information, reliability information, an available transaction place, available transaction time, and/or the like. The preference of a seller may be determined according to information included in the response message, and a buyer to transact may be selected by calculating with a weight value based on the preference.

In addition or alternatively, a sales price may be adjusted based on desired purchase price of a buyer in the response message.

If the message transmitted in the operation 602 is a buyer's message, a seller to transact may be determined based on information included in the received response message. In this case, the response message may include information such as, for example, seller's credit information (e.g., a certificate authenticated by a server that guarantees credit), the sales price, reliability information (e.g., the number of times of successful product transaction), an available transaction place, available transaction time, and/or the like. If the message transmitted in the operation 602 is a seller's message, a buyer to transact may be determined based on information included in the received response message. In this case, the response message may include information such as, for example, buyer's credit information (e.g., a certificate authenticated by a server that guarantees credit), desired purchase price, reliability information (e.g., the number of times of successful product transaction), an available transaction place, available transaction time, and/or the like.

For example, when the response message is determined to include information that is the same as or similar to information by which a user set interest items, the information may be provided to a user and/or other electronic devices. In providing the information to a user, for example, the information may be provided through output interfaces (e.g., at least one of the display module 260, the indicator 297, the speaker 282, the earphone 286) of the electronic device that receives the response message. When additional information or overall information is requested by a user and/or other electronic devices regardless of the configuration of the interest items, the corresponding information may be provided to a user and/or other electronic devices.

According to an embodiment, the electronic device may display information included in the response message according to a weight value. For example, the electronic device may determine the sequence (e.g., sequence in the list) or the location of information included in the response message depending on a weight value. According to an embodiment, the electronic device may display (e.g., at least one of icons, marks, text, images) information included in the response message on a map image in relation to the location, and allow the information to be displayed with different sizes, forms, colors, and positions according to a weight value on the display. According to an embodiment, the electronic device may output information included in the response message through audio output devices (e.g., speakers, earphones, or headsets), and allow the information to be output in order of a weight value, or predetermined pieces of information or less may be output. According to another embodiment, when the information included in the response message, which has a weight value more than a predetermined value is received, the electronic device may provide the information through a haptic feedback (e.g., at least one of vibration, texture and friction) to a user. For example, in displaying several pieces of information on the map through a friction display (e.g., a capacitive vibration display or a vibration display using an actuator) functionally connected with the electronic device, when a user input is generated in at least one area where information having a designated weight value is displayed, texture or friction may be provided.

According to an embodiment, the weight value of information included in the response message may be based on at least one piece of information included in the response message. For example, the electronic device may select and store the weight value through a user input, or automatically determine the weight value based on a user transaction history (e.g., at least one of a transaction place, transaction time and reliability information). For example, a user who prefers transaction safety may put a high weight value to sellers or buyer's credit information or reliability information. In another example, price or available transaction time may be decided to have a high priority or weight value. That is, in a case in which the place where many transactions have been made before and the time when many transactions have been made before may be determined to have a highest weight value, information of the response message which satisfies the corresponding condition may be displayed on the map to be relatively large or in noticeable color, or to overlap with the map at an upper layer.

According to an embodiment, when information is provided to a user and/or other electronic devices, for example, seller/buyer information is arranged according to an effective value of the received message, price and/or other values (e.g., values calculated from profiles based on the user transaction history) selected by a user to be thereby provided to the user and the other electronic devices.

The operations 602 and/or 604 may be repeated more than once, for example, in order to complete a determination for product transaction such as product price. A plurality of sellers and/or buyers may operate the transaction.

In operation 606, electronic devices that are to transmit and receive information requiring security may be authenticated with each other. For example, when it is determined that transaction is to be carried out in response to the received response message in the operation 604, authentication of an electronic device may be performed using a permanent identifier in order to encrypt credit information and messages between electronic devices. The authentication may be conducted by, for example, an authentication server. A permanent identifier (e.g., a unique value received through the identifier generation server) of an electronic device of a counterpart and/or a permanent identifier of the electronic device may be transferred to the authentication server. The authentication server may identify that the electronic device of the counterpart is an available transaction electronic device (e.g., through a method of identifying that the electronic device is registered in the authentication server, or authentication information of the electronic device is valid), and may inform the electronic device of the same. If the electronic device of the counterpart is not an available electronic device, the authentication server may inform the electronic device of the same.

For example, the electronic device may allow at least one of a temporary identifier of the electronic device, a temporary identifier of the electronic device of the counterpart, a permanent identifier of the electronic device which are used for transmitting and receiving messages through a public channel, or a communication session identifier that is communicated through a public channel to be included in the first message to be thereby transmitted to the authentication server. Also, the electronic device of the counterpart may allow at least one of a temporary identifier of the electronic device of the counterpart, a temporary identifier of the electronic device, a permanent identifier of the electronic device of the counterpart, or a communication session identifier that is communicated through a public channel to be included in the second message to be thereby transmitted to the authentication server. The authentication server may identify transaction counterparts through at least one of temporary identifiers of the electronic device and the electronic device of the counterpart, or the communication session identifier in the first message and the second message, and determine to allow the electronic devices to authenticate each other.

When the electronic device of the counterpart fails in authentication (e.g., the authentication server informs that transaction is not available), the electronic device may terminate the transaction. When the authentication is successful (e.g., the authentication server informs that transaction is available), the electronic device may obtain, for example, an encryption key for encrypting messages between the electronic devices. The encryption key may be transmitted from, for example, the authentication server. The encryption key may be generated in the electronic device.

According to an embodiments the electronic device and the electronic device of the counterpart may separately perform each authentication operation. For example, each electronic device may separately receive the encryption key. The electronic device and the electronic device of the counterpart may decrypt the encryption messages generated based on the encryption key.

According to an embodiment, the authentication may be performed without the authentication server. For example, the electronic devices may authenticate by exchanging authentication information through NFC (e.g., NFC 239), facial recognition information through a camera (e.g., the camera 291), voice recognition through a microphone (e.g., the microphone 288), certified security modules, information of general applications, or SNS information.

In operation 608, the electronic device may transmit and receive the authenticated message(s) (e.g., a third authenticated message). In operation 610, the electronic device may receive a (fourth) response authentication message in response to the (third) authenticated message(s). For example, the electronic device may transmit and receive information for electronic commerce or a direct transaction based on the authenticated message. The authenticated message may be repeated more than once. The electronic device may perform at least one operation of storing for a specific time or deleting in a specific time with respect to transaction information and transaction counterpart information used in the transaction.

Figure 7:
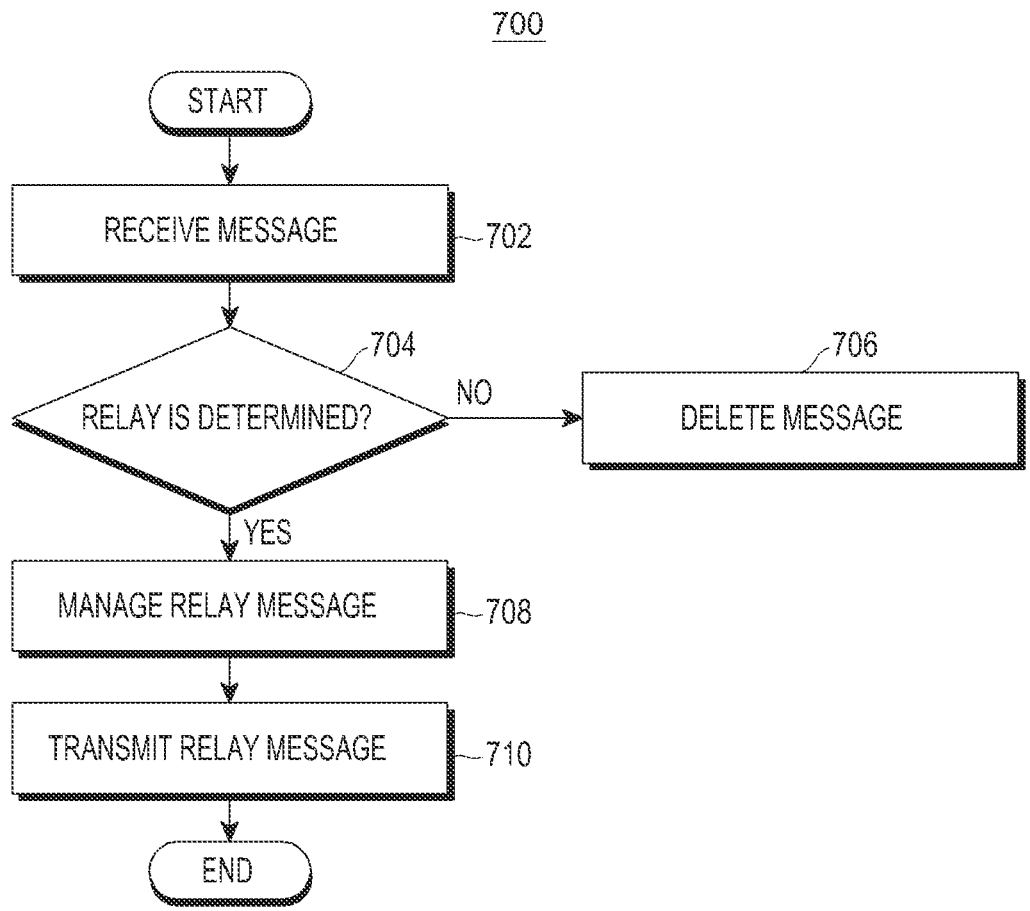
FIG. 7 is a flowchart illustrating a method for transferring messages in electronic devices according to an embodiment of the present disclosure.

FIG. 7 is a flowchart illustrating a method for transferring messages in electronic devices according to an embodiment of the present disclosure. According to an embodiment, the operations of FIG. 7 may be carried out by an electronic device 101. Further, the operations of FIG. 7 may be carried out by the message management module 170.

Referring to FIG. 7, a flowchart 700 is illustrated, where an electronic device (e.g., electronic device 101) may perform an operation 702 of receiving a message. The electronic device may perform an operation 704 of determining a relay of the message based on the received message. The electronic device may determine to relay the message when an identifier in the received message is different from the identifier of the receiving electronic device. If information on the electronic device states that the message is not to be relayed, the received message may not be relayed. The electronic device may use additional data to determine the relay. The additional data may be the number of times of relaying messages, location range information of messages, time range information of messages, a message valid period, a message valid area, transmission environment information, or the like. If the received message has information on the number of times of relaying messages, the electronic device may relay messages within a certain number of times. If the electronic device satisfies the location range information and the time range information of the received message, the electronic device may relay the message. If the electronic device satisfies a message valid period or a message valid area, the message may be relayed. If the transmission environment is more than a reference value, the electronic device may relay the message. If it is impossible to relay the message, the electronic device may delete the module in an operation 706.

The electronic device may perform an operation 708 of managing a relay message if it is possible to relay the message. The relay message may be the relay message of FIG. 5. The operation of managing the relay message may include an operation of relaying the message without a change, an operation of relaying two or more messages by merging them into one message without a loss, an operation of relaying one message by dividing it into two or more messages, an operation of relaying one message with the amount of data adjusted, an operation of relaying two or more messages by merging them into one message with the amount of data adjusted, or the like. When the operation of relaying the relay message is performed, the electronic device may accumulate a compensation value. The compensation value may be used in services for the message. For example, in selling products, if the operation of receiving the permanent identifiers from the server is not free, with respect to the electronic device having a compensation value more than a reference value, the charge may be reduced (for example, by deducting the compensation value from the charge) or the period of using the permanent identifier may be extended. In addition or alternatively, in a case in which an operation of selling products is controlled by a selling server, the electronic device may obtain an additional selling authority with respect to the corresponding selling operation.

The electronic device may perform an operation 710 of transmitting the relay message. The operation of transmitting the relay message may be the same as the operation of transmitting the non-encryption message, the response non-encryption message, the relay message, the response relay message, the encryption message, and the response encryption message of FIG. 5.

Figure 8:
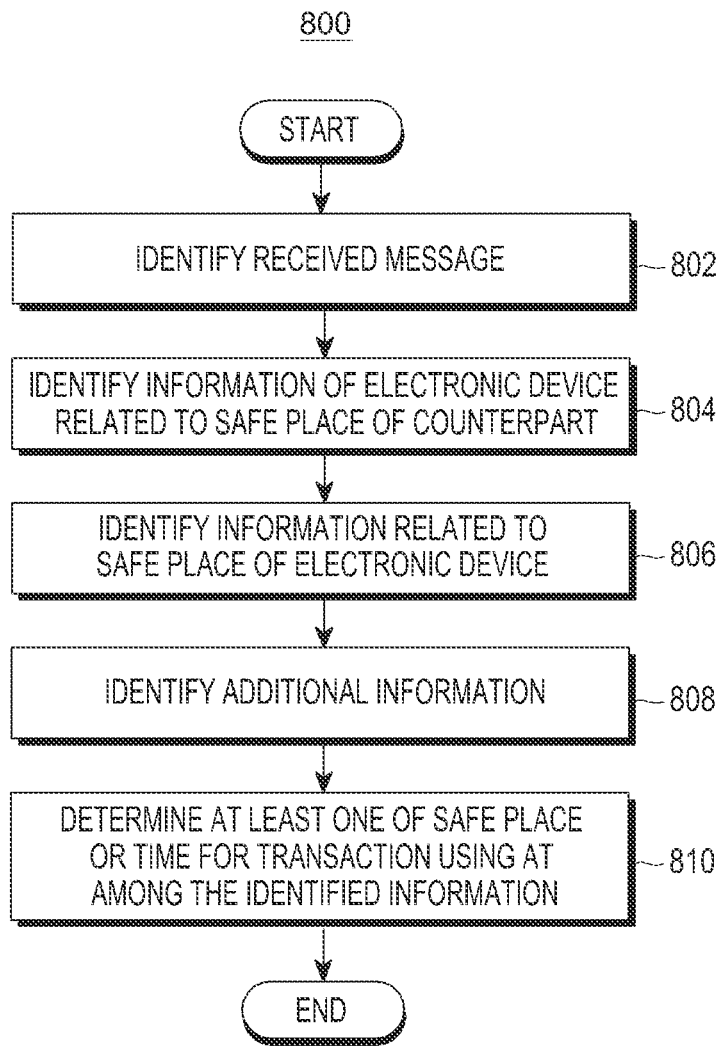
FIG. 8 is a flowchart illustrating determination of a location between electronic devices according to an embodiment of the present disclosure.

FIG. 8 is a flowchart illustrating a determination of a location between electronic devices according to an embodiment of the present disclosure. The operations of the flowchart may be carried out by the electronic device 101.

Referring to FIG. 8, a flowchart 800 is illustrated, where an electronic device may perform an operation 802 of checking (identifying) a received message upon receiving the message. The electronic device may perform an operation 804 of checking (identifying) information of an electronic device for communication (e.g., an electronic device related to a safe place of a counterpart). The information of an electronic device for communication may be information for selecting a transaction location and/or time.

The electronic device may perform an operation 806 of checking (identifying) information of electronic device (e.g., information related to a safe place of the electronic device) stored in the electronic device for communication. The information may be information for selecting a transaction location and/or time. The information related to the operation 804 and the operation 806 may be at least one of the locations of the electronic devices, a desired transaction place, available transaction time, a travel distance to the desired transaction place, transportation, schedule information of the electronic devices, a pre-set desired place or desired time.

In addition to the related information or alternatively, the electronic device may identify additional information. The electronic device may perform an operation 808 of checking (identifying) the additional information through internal related applications, external servers, and neighbor devices. The additional information may be information related to a transaction. The related information may be places where many transactions have been made, places (e.g., public offices, squares, banks, shopping malls, police stations, or the like) which are determined to be safe among POI information of map applications, places where many security devices (e.g., CCTVs, monitoring devices, or the like) are provided, or the like. In addition or alternatively, the related information may be a dedicated place for the transaction.

The electronic device may perform an operation 810 of determining at least one of the location (e.g., a safe place) or time based on the related (identified) information. The operation of determining may include an operation of determining a place for transaction and time. The operation of determining using the information may be performed based on the priority configured in the electronic device. The determination may be made with respect to the highest value based on the priority and the weight value configured in the electronic device. For example, the place and the time where and when a user usually transacts may be considered to have a high priority and a high weight value. The electronic device may inform a user of the results through the interface.

According to an embodiment, the electronic device may display the related information or the additional information in different sequences or locations according to the priority or the weight value. According to an embodiment, the electronic device may display (e.g., at least one of icons, marks, text, and images) the related information or the additional information on the map depending on the location, and display the same to be different in sizes, forms, colors, and arranging sequences according to the priority or the weight value. According to an embodiment, the electronic device may output the related information or the additional information through audio output devices (e.g., speakers, earphones, or headsets), and an output sequence may be determined or predetermined pieces of information may be output according to the priority or the weight value. According to another embodiment, when the related information or the additional information having a priority or a weight value more than a reference value is received, the electronic device may provide the same to a user through a haptic feedback (e.g., at least one of vibration, texture, and friction). For example, in displaying several pieces of information on the map through a friction display, when a user input is generated in areas where information having a designated priority or weight value is displayed, the electronic device may provide texture or friction.

This priority or weight value may be based on one or more of the related information or the additional information. To this end, the priority or the weight value may be set by a user's input and selection or may be automatically determined based on a previous user history (e.g., at least one of a transaction place, transaction time, counterpart information). For example, a user who prefers a safety may determine the priority or the weight value based on POI and transaction time. In another example, price or available transaction time may be determined to have a high priority or a high weight value. The arranging sequence may include an arrangement at upper, lower, left and right positions on two dimensional planes, a layer sequence in a stack structure or an overlay structure, or an arrangement in a foreground region and a background region.

A plurality of results may be obtained, and a user may select at least one of the results. The selected result may be transmitted to the electronic device for communication. The electronic device for communication may determine the location and time again based on the results selected by the electronic device for communication and results transmitted by the electronic device. The operation of determining the results may be repeated several times. The determined operation may be informed to a user through interfaces of the electronic device by the finally agreed result. The electronic device may induce a user to move to the final result according to the finally agreed result.

Figure 9:
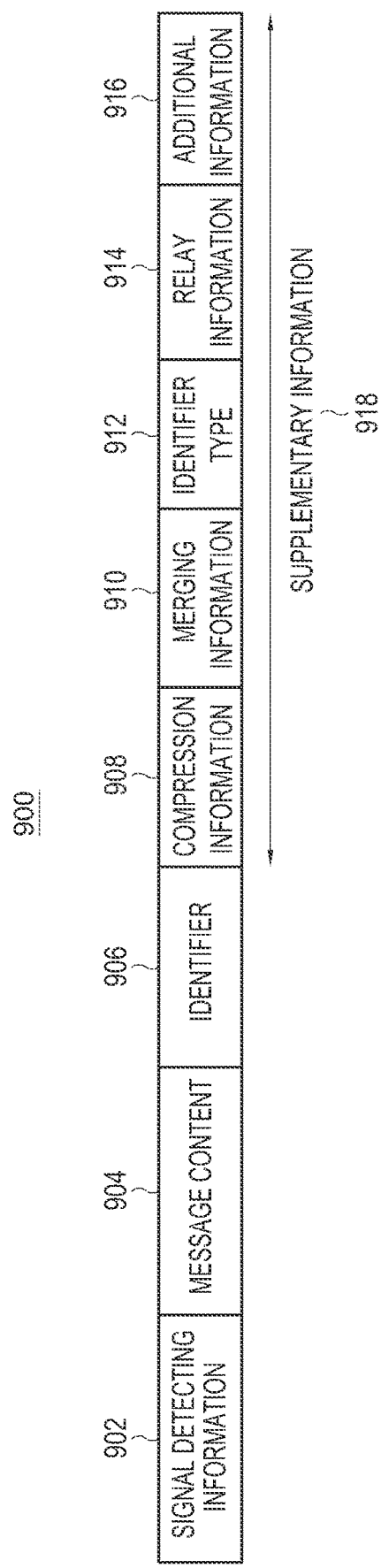
FIG. 9 is a block diagram illustrating a configuration of a message according to an embodiment of the present disclosure.

FIG. 9 is a block diagram illustrating a configuration of a message according to an embodiment of the present disclosure. The message of FIG. 9 may be used in an electronic device 101. The message may be used by a message management module 170.

Referring to FIG. 9, a block diagram 900 is illustrated, where a message may be the non-encryption message 506, the response non-encryption message 508, the encryption message 510, the response encryption message 512, the relay message 518, the relay message 522, the response relay message 524, the response relay message 520, or the message used in authentication operation 509.

The message may include signal detecting information 902, a message content 904, an identifier 906, compression information 908, merging information 910, an identifier type 912, relay information 914, and/or additional information 916. The arranging sequence of the information may be changed. The compression information 908, the merging information 910, the identifier type 912, the relay information 914 and the additional information 916 may be identified as supplementary information 918. The electronic device may receive the message through a communication standard designated between electronic devices, and identify the configuration of the information. For example, the overall size of the message and index information for the location of each configuration may be determined by a predetermined communication standard. The electronic device including the predetermined communication standard may generate and transmit a message according to the configuration of the message. Other electronic device that receive the message may identify the message based on the predetermined communication standard. For example, the electronic device may identify the first information of signal detecting information 902, the second information of a message content 904, the third of an identifier 906, the fourth information of a compression information 908, the fifth information of merging information 910, the sixth information of an identifier type 912, the seventh information of relay information 914, and eighth information of additional information 916 in the received message. Each configuration may be identified by a predetermined size. For example, when the signal detecting information 902 is defined to have 2 bytes, and the message content 904 is defined to have 3 bytes, the signal detecting information 902 may be allocated by 0 byte to 2 bytes, and the message content 904 may be allocated by 2 bytes to designated 5 bytes.

The signal detecting information 902 may be received through the communication interface 160 of the electronic device. The message may be identified and received by the signal detecting information 902 according to the predetermined communication standard. For example, the electronic device may receive the signal detecting information 902 to compare the same with a predetermined pattern, and if a signal having a value more than a reference value is detected, the message may be obtained based on the predetermined communication standard.

The message content 904 may include various contents. The message may include information on applications that use the message, and other information used in transmitting and receiving messages.

The identifier 906 may include a temporary identifier or a permanent identifier. The identifier 906 may include at least one of an identifier of a transmitting electronic device or an identifier of receiving electronic device.

The compression information 908 may include information such as whether information included in the message content is compressed or not, a compression ratio, a compression algorithm, or the like. The electronic device may identify compression information included in the message relay process of FIG. 7 through the compression information, and receive the message to an extent that the compression ratio can be changed, to thereby change the compression ratio of the message.

The merging information 910 may be used in merging information included in the message content. The electronic device may use the merging information 910 in the merging operation included in the message relay operation of FIG. 7.

The identifier type 912 may distinguish the type of identifier included in the identifier 906. The identifier type may be a temporary identifier or a permanent identifier.

The relay information 914 may be used in determining whether the message is transmitted. The relay information may include information such as a relay area range, message valid time, the maximum number of times for relay. The relay information may be used in relation to the message relay operation of FIG. 7.

The addition information 916 may be used by defining various pieces of information used in the transmitting electronic device, the relaying electronic device, and the receiving electronic device in relation to transmission and reception of messages of the electronic device. For example, predetermined users may be determined to receive the message, and users other than the predetermined users may not be allowed to use.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method by a first user electronic device, the communication method comprising:
    receiving a user input for determining transaction information including at least one of a product on sale, a time when the product on sale is available for purchase, or a location where the product on sale is available for purchase;
    transmitting a first message, which is not encrypted, including first user data related to the determined transaction information to a second user electronic device;
    receiving, from the second user electronic device, a second message in direct response to the first message, the second message, which is not encrypted, including second user data corresponding to the first user data;
    determining whether a predetermined condition for transacting the product on sale is satisfied based on at least one of the first user data included in the first message or the second user data included in the second message;
    in response to determining that the predetermined condition is not satisfied:
        transmitting a third message, which is not encrypted, to the second user electronic device, and
        receiving a fourth message which is not encrypted from the second user electronic device;
    in response to determining that the predetermined condition is satisfied:
        performing an authentication operation with the second user electronic device or an authentication server, based on a result of the performing of the authentication operation, transmitting a first authentication message, which is encrypted, to the second user electronic device,
        receiving a second authentication message, which is encrypted, from the second user electronic device, and
        based on the first authentication message and the second authentication message, determining whether to change at least one of the location or the transaction time.

2. The communication method of claim 1, wherein the first authentication message and the second authentication message include at least one of credit information or reliability information.

3. The communication method of claim 1, further comprising:
    managing at least one of the first message, the second message, or a relay message that is at least one of transmitted or received in the first user electronic device; and
    transmitting, by the first user electronic device, the at least one of the first message, the second message, or the relay message to the second user electronic device to transmit the at least one of the first message, the second message, or the relay message to another electronic device if the other electronic device is determined as a designated receiver of the at least one of the first message, the second message, or the relay message.

4. The communication method of claim 3, wherein the managing comprises determining whether the at least one of the first message, the second message or the relay message is transmitted from the first user electronic device to the second user electronic device to transmit the at least one of the first message, the second message, or the relay message to the other electronic device.

5. The communication method of claim 3, wherein the managing comprises performing at least one of merging, changing, or deleting of the at least one of the first message, the second message, or the relay message.

6. The communication method of claim 5, wherein the managing comprises adjusting an amount of information of the at least one of the first message, the second message, or the relay message.

7. The communication method of claim 6, wherein the adjusting comprises adjusting at least one of a number of letters, a type of information, a resolution of information, or a compression ratio of information which is included in the at least one of the first message, the second message, or the relay message.

8. The communication method of claim 3, wherein the managing comprises determining whether to relay the relay message based on additional data of the at least one of the first message, the second message, or the relay message.

9. The communication method of claim 8, wherein the additional data includes at least one of a number of times of a relay, a compensation point of the relay message, or a type of content included in the at least one of the first message, the second message, or the relay message.

10. The communication method of claim 3, wherein the at least one of the first message, the second message or the relay message is managed based on at least one of a number of times of relaying messages, a reference number of times of a relay, a message valid period, a message valid place, a product name, or a selling place.

11. A first user electronic device comprising:
    a transceiver; and at least one processor configured to:
receive a user input for determining transaction information including at least one of a product on sale, a time when the product on sale is available for purchase, or a location where the product on sale is available for purchase,
control the transceiver to transmit a first message, which is not encrypted, including first user data related to the transaction information to a second user electronic device,
control the transceiver to receive a second message in direct response to the first message, the second message including second user data, which is not encrypted,
determine whether a predetermined condition for transacting the product on sale is satisfied based on at least one of the first user data included in the first message or the second user data included in the second message,
in response to determining that the predetermined condition is not satisfied:
control the transceiver to transmit a third message, which is not encrypted, to the second user electronic device, and
control the transceiver to receive a fourth message, which is not encrypted, from the second user electronic device, and
in response to determining that the predetermined condition is satisfied:
perform an authentication operation with the second user electronic device or an authentication server, and
based on a result of the performing of the authentication operation, control the transceiver to transmit a first authentication message, which is encrypted, to the second user electronic device,
control the transceiver to receive a second authentication message, which is encrypted, from the second user electronic device, and
based on the first authentication message and the second authentication message, determine whether to change at least one of the transaction location or the transaction time.

12. The first user electronic device of claim 11, wherein the at least one processor is further configured to transmit the first message at at least one of a specific place corresponding to the transaction location or a specific time corresponding to the transaction time.

13. The first user electronic device of claim 11, wherein the at least one processor is further configured to determine whether to change the at least one of the location or the time based on at least one piece of location candidate information stored in a server having location information.

14. The first user electronic device of claim 11, wherein the at least one processor is further configured to, determine whether to change the transaction location based on interest location information of a map application program, a place where transactions are frequently made, a public facility, a public place, a density of other electronic devices, or a place where a number of security devices is equal to or more than a predetermined value.

15. The first user electronic device of claim 11, wherein the at least one processor is further configured to determine whether to change the at least one of the transaction location or the transaction time based on at least one of a distance between the first user electronic device and the second user electronic device, moving time between positions of the first user electronic device and the second user electronic device, function required time of the first user electronic device and the second user electronic device, or average location information of the first user electronic device and the second user electronic device.

16. A non-transitory computer-readable recording medium having a program recorded thereon, the program causing a computer to execute a method comprising:
receiving a user input for determining transaction information including at least one of a product on sale, a time when the product on sale is available for purchase, or a location where the product on sale is available for purchase;
transmitting a first message, which is not encrypted, including first user data related to the determined transaction information;
receiving, from the second user electronic device, a second message in direct response to the first message, the second message, which is not encrypted, including second user data corresponding to the first user data;
determining whether a predetermined condition for transacting the product on sale is satisfied based on at least one of the first user data included in the first message or the second user data included in the second message;
in response to determining that the predetermined condition is not satisfied:
transmitting a third message, which is not encrypted, to the second user electronic device, and
receiving a fourth message which is not encrypted from the second user electronic device; and
in response to determining that the predetermined condition is satisfied:
performing an authentication operation with the second user electronic device or an authentication server, and
based on a result of the performing of the authentication operation, transmitting a first authentication message, which is encrypted, to the second user electronic device, and
receiving a second authentication message, which is encrypted, from the second user electronic device, and
based on the first authentication message and the second authentication message, determine whether to change at least one of the transaction location or the transaction time.

17. The non-transitory computer-readable recording medium of claim 16,
wherein the first message is transmitted on a public broadcasting channel,
wherein the first message is a non-encrypted buyer's message,
wherein the second message is transmitted on the public broadcasting channel, and
wherein the second message is a non-encrypted seller's message.

* * * * *